United States Patent
Morosawa et al.

(10) Patent No.: US 8,078,920 B2
(45) Date of Patent: Dec. 13, 2011

(54) INFORMATION PROCESSING DEVICE AND ERROR PROCESSING METHOD

(75) Inventors: Atsushi Morosawa, Kawasaki (JP); Takaharu Ishizuka, Kawasaki (JP); Toshikazu Ueki, Kawasaki (JP); Makoto Hataida, Kawasaki (JP); Yuka Hosokawa, Kawasaki (JP); Takeshi Owaki, Kawasaki (JP); Takashi Yamamoto, Kawasaki (JP); Daisuke Itou, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 61 days.

(21) Appl. No.: 12/554,318

(22) Filed: Sep. 4, 2009

(65) Prior Publication Data

US 2010/0077262 A1    Mar. 25, 2010

Related U.S. Application Data

(63) Continuation of application No. PCT/JP2007/056858, filed on Mar. 29, 2007.

(51) Int. Cl.
*G06F 11/00* (2006.01)

(52) U.S. Cl. ............ 714/48; 714/715; 714/55; 714/797; 714/713; 711/119; 711/131

(58) Field of Classification Search .................. 714/703, 714/713, 797, 55, 715
See application file for complete search history.

(56) References Cited

U.S. PATENT DOCUMENTS

| | | | |
|---|---|---|---|
| 5,193,175 A * | 3/1993 | Cutts et al. ........................ 714/11 |
| 5,295,258 A * | 3/1994 | Jewett et al. ..................... 714/12 |
| 5,388,242 A * | 2/1995 | Jewett ............................ 711/113 |
| 5,546,396 A * | 8/1996 | Clauzel et al. ................ 370/464 |
| 5,689,632 A | 11/1997 | Galy et al. |
| 5,809,533 A * | 9/1998 | Tran et al. ...................... 711/141 |
| 5,912,901 A * | 6/1999 | Adams et al. ................. 714/733 |
| 5,953,530 A * | 9/1999 | Rishi et al. .................... 717/127 |
| 6,263,452 B1 * | 7/2001 | Jewett et al. ...................... 714/9 |
| 6,543,016 B1 * | 4/2003 | Lewandowski et al. ...... 714/718 |
| 7,107,484 B2 * | 9/2006 | Yamazaki et al. .............. 714/12 |
| 7,483,382 B1 * | 1/2009 | Toillon et al. ................. 370/242 |

(Continued)

FOREIGN PATENT DOCUMENTS

DE    WO9944135    *    8/1998

(Continued)

OTHER PUBLICATIONS

Alena, "Comunications for integrated modular avionics", Dec. 2006, IEEEAC Ver. 1.3, pp. 1-18.*

(Continued)

*Primary Examiner* — Robert Beausoliel, Jr.
*Assistant Examiner* — Jeison C Arcos
(74) *Attorney, Agent, or Firm* — Staas & Halsey LLP

(57) ABSTRACT

An information processing device having two processing units capable of operating in synchronization with each other, includes: a common unit capable of outputting an identical signal to the two processing units; detection units that are respectively provided for the processing units and each detects errors occurred in corresponding processing unit respectively; a comparison unit that compares outputs from the two processing units; and a control unit that controls signals from the processing units to the common unit, based on a detection result of the detection units and a comparison result of the comparison unit, and determines, if errors of an identical type are simultaneously detected by the detection units, that the errors are due to an error of the common unit.

11 Claims, 23 Drawing Sheets

U.S. PATENT DOCUMENTS

| | | | |
|---|---|---|---|
| 2002/0040455 A1* | 4/2002 | Nakamura | 714/719 |
| 2002/0103957 A1* | 8/2002 | Nie et al. | 710/310 |
| 2002/0143998 A1* | 10/2002 | Rajagopal et al. | 709/248 |
| 2002/0144175 A1* | 10/2002 | Long et al. | 714/11 |
| 2003/0005371 A1* | 1/2003 | Miller | 714/715 |
| 2004/0078614 A1* | 4/2004 | Toillon et al. | 713/500 |
| 2004/0123201 A1* | 6/2004 | Nguyen et al. | 714/736 |
| 2004/0153888 A1* | 8/2004 | Kadoi | 714/57 |
| 2004/0205420 A1* | 10/2004 | Seeley et al. | 714/57 |
| 2004/0221195 A1* | 11/2004 | Mizutani et al. | 714/12 |
| 2005/0246578 A1* | 11/2005 | Bruckert et al. | 714/11 |
| 2006/0149986 A1* | 7/2006 | Mizutani | 713/375 |
| 2006/0190788 A1* | 8/2006 | Jasinski et al. | 714/733 |
| 2006/0212652 A1* | 9/2006 | Ishizuka et al. | 711/119 |
| 2006/0212656 A1* | 9/2006 | Ueki et al. | 711/131 |
| 2006/0212753 A1 | 9/2006 | Sato | |
| 2006/0224808 A1* | 10/2006 | Depew et al. | 710/267 |
| 2006/0245264 A1* | 11/2006 | Barr et al. | 365/189.01 |
| 2007/0294602 A1* | 12/2007 | Miller | 714/55 |

FOREIGN PATENT DOCUMENTS

| | | |
|---|---|---|
| EP | 1 703 401 A2 | 9/2006 |
| JP | 4-153838 | 5/1992 |
| JP | 4-302332 | 10/1992 |
| JP | 2002-14943 | 1/2002 |
| JP | 2004-46599 | 2/2004 |
| JP | 2006-510117 | 3/2006 |

OTHER PUBLICATIONS

Black, "Next generation space avionics: A highly reliable layered system implemetation", 2004, IEEE, pp. 1-15.*

Davies, "Synchronization and matching in redundant systems", Mar. 1978, IEEE, pp. 1-9.*

International Preliminary Report on Patentability, mailed Oct. 20, 2009, in corresponding International Application No. PCT/JP2007/056858 (5 pp.).

European Search Report issued Sep. 23, 2010 in corresponding European Patent Application 07740296.4.

European Search Report issued Aug. 26, 2011 in corresponding European Application No. 11163540.5 (5 pages).

International Search Report, mailed May 29, 2007, in corresponding International Application No. PCT/JP2007/056858 (10 pp.)

* cited by examiner

FIG. 2

| CASE NO. | LINE-A ERROR NOTIFICATION SIGNAL | | LINE-B ERROR NOTIFICATION SIGNAL | | COMPARISON ERROR | SELECT SIGNAL |
|---|---|---|---|---|---|---|
| | 8a | 11a0 | 11a1 | 8b | 11b0 | 11b1 | 10 | 13 |
| 1 | No Error | No Error | No Error | No Error | No Error | No Error | No Error | EITHER 5a OR 5b IS OK |
| 2 | No Error | No Error | No Error | No Error | No Error | No Error | Error | ERROR STOP |
| 3 | No Error | No Error | No Error | Error OF ANY CPU ON LINE B | | | – | SELECT 5a THEREAFTER |
| 4 | Error OF ANY CPU ON LINE A | | | No Error | No Error | No Error | – | SELECT 5b THEREAFTER |
| 5 | No Error | No Error | No Error | No Error | No Error | No Error | No Error | EITHER 5a OR 5b IS OK |
| 6 | No Error | Error | No Error | No Error | Error | No Error | Error | ERROR STOP |
| 7 | No Error | No Error | Error | No Error | No Error | No Error | No Error | EITHER 5a OR 5b IS OK |
| 8 | No Error | No Error | Error | No Error | No Error | Error | Error | ERROR STOP |
| 9 | No Error | Error | Error | No Error | No Error | No Error | No Error | EITHER 5a OR 5b IS OK |
| 10 | No Error | Error | Error | No Error | Error | Error | Error | ERROR STOP |
| 11 | ERROR ON BOTH LINES OTHER THAN ABOVE ERRORS | | | | | | – | ERROR STOP |

FIG. 8

| CASE NO. | LINE-A ERROR NOTIFICATION SIGNAL | | LINE-B ERROR NOTIFICATION SIGNAL | | COMPARISON ERROR | SELECT SIGNAL |
|---|---|---|---|---|---|---|
| | 16a0 | 16a1 | 16b0 | 16b1 | 10 | 13 |
| 1 | Error OF ANY CPU on line A | No Error | | No Error | No Error | SELECT 5a THEREAFTER |
| 2 | Error OF ANY CPU on line A | No Error | | No Error | Error | ERROR STOP |
| 3 | | No Error | Error OF ANY CPU on line B | | No Error | SELECT 5b THEREAFTER |
| 4 | | No Error | Error OF ANY CPU on line B | | Error | ERROR STOP |
| 5 | Error OF ANY CPU on line A | | Error OF ANY CPU on line B | | No Error | EITHER 5a OR 5b IS OK |
| 6 | Error OF ANY CPU on line A | | Error OF ANY CPU on line B | | Error | ERROR STOP |

FIG. 26

| CASE NO. | LINE-A ERROR NOTIFICATION SIGNAL | | | LINE-B ERROR NOTIFICATION SIGNAL | | | COMPARISON ERROR | SELECT SIGNAL |
|---|---|---|---|---|---|---|---|---|
| | 8a | 11a0 | 11a1 | 8b | 11b0 | 11b1 | 10 | 13 |
| 1 | No Error | No Error | | No Error | No Error | | No Error | CONVENTIONAL ART |
| 2 | No Error | No Error | | No Error | No Error | | Error | EITHER 5a OR 5b IS OK |
| 3 | No Error | No Error | | Error OF ANY CPU ON LINE B | | | – | ERROR STOP |
| 4 | Error OF ANY CPU ON LINE A | | | No Error | No Error | | – | SELECT 5a THEREAFTER |
| 5 | | | | | | | No Error | SELECT 5b THEREAFTER |
| 6 | No Error | Error | No Error | No Error | Error | No Error | Error | ERROR STOP |
| 7 | | | | | | | No Error | ERROR STOP |
| 8 | No Error | No Error | Error | No Error | No Error | Error | Error | ERROR STOP |
| 9 | | | | | | | No Error | ERROR STOP |
| 10 | No Error | Error | Error | No Error | Error | Error | Error | ERROR STOP |
| 11 | ERROR ON BOTH LINES OTHER THAN ABOVE ERRORS | | | | | | – | ERROR STOP |

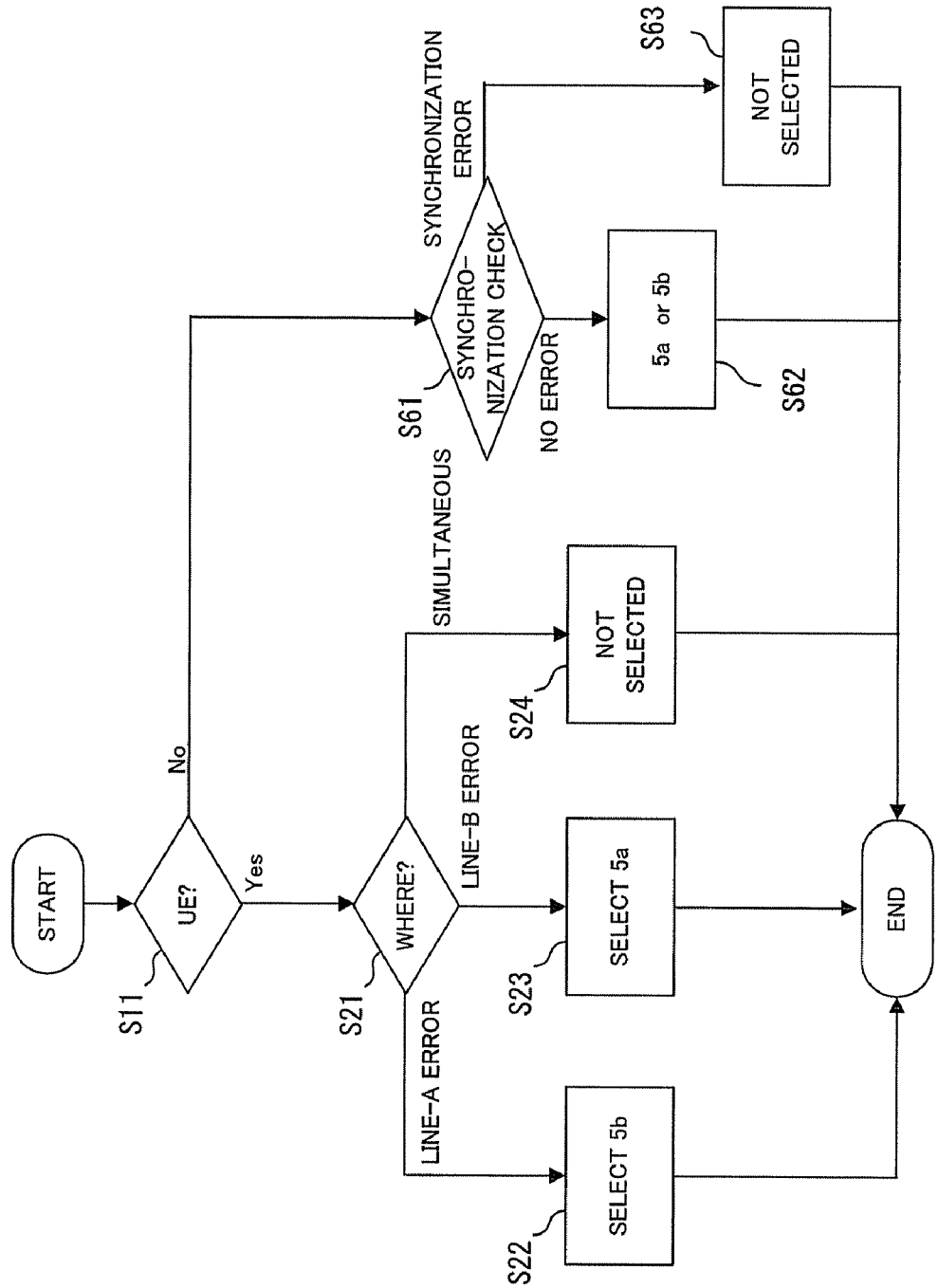

US 8,078,920 B2

INFORMATION PROCESSING DEVICE AND ERROR PROCESSING METHOD

CROSS-REFERENCE TO RELATED APPLICATIONS

This application is a continuation application, filed under 35 U.S.C. §111(a), of PCT Application No. PCT/JP2007/056858, filed Mar. 29, 2007, the disclosure of which is herein incorporated in its entirety by reference.

FIELD

The embodiments discussed herein are related to an information processing device having plural processing devices synchronized with each other, and an error, processing method.

BACKGROUND

An information processing system using a conventional mirror mode (duplexing) will now be described. The mirror mode is an information processing technique of allowing a system to operate, even when a trouble occurs on one system, with use of another line by performing processing while synchronizing the one line (synchronized unit) with the another line.

Now, a description will be made of a system configuration of a conventional information processing system using a mirror mode. FIG. 25 is a block diagram illustrating a configuration example of a conventional information processing system. The information processing system is constituted by two lines A and B which perform synchronous operation, and includes a control system 1, processing devices 2a0 and 2a1 on the line A, and processing devices 2b0 and 2b1 on the line B. The processing devices are, for example, CPUs. The processing devices 2a0, 2a1, 2b0, and 2b1 each has an error checker inside. The control system 1 includes an interface (A IF) 4a for the line A, an interface (B IF) 4b for the line B, error checkers 7a and 7b, a comparator 9, a selector generation unit 12, a selector 14, and a common unit 15. Of these components, the processing devices 2a0, 2a1, A IF 4a, and error checker 7a are on the line A while the processing devices 2b0, 2b1, B IF 4b, and error checker 7b are on the line B.

The control system 1 is connected to the processing devices 2a0 and 2a1 through a route 3a and the A IF 4a, and is also connected to the processing devices 2b0 and 2b1 through a route 3b and the B IF 4b. The lines A and B operate synchronously and each has three error checkers (wherein the line A includes the error checker 7a and the error checkers in the processing devices 2a0 and 2a1, and the line B includes the error checker 7b and the error checkers in the processing devices 2b0 and 2b1). The comparator 9 carries out a synchronization check between a signal 5a outputted from the line A and a signal 5b outputted from the line B.

Output of the common unit 15 is inputted to the processing devices 2a0 and 2a1 through the A IF 4a, and to the processing devices 2b0 and 2b1 through the B IF 4b. Accordingly, a UE (uncorrectable error) in the common unit 15 propagates to the lines A and B when the processing devices read from the common unit. The UE is therefore detected on both the lines A and B.

The selector generation unit 12 makes a determination based on a signal 10 outputted from the comparator 9, a signal 8a outputted from the error checker 7a, a signal 8b outputted from the error checker 7b, a signal 11a0 outputted from the error checker inside the processing device 2a0, a signal 11a1 outputted from the error checker inside the processing device 2a1, a signal 11b0 outputted from the error checker inside the processing device 2b0, and a signal 11b1 outputted from the error checker inside the processing device 2b1. In accordance with a signal 13 indicating a determination result from the selector generation unit 12, the selector 14 selects and outputs either the signal 5a or 5b to the common unit 15.

Described below is a case that an error checker detects a UE.

Next, operation of receiving an error signal by the selector generation unit 12 will be described. FIG. 26 is a table illustrating an operation example of receiving a UE signal by a conventional selector generation unit. This table represents content of the select signal 13 as outputted from the selector generation unit 12 in relation to content of line-A error signals (e.g., the signals 8a, 11a0, and 11a1), line-B error signals (e.g., the signals 8b, 11b0, and 11b1), and synchronization errors (comparison errors and the signal 10) inputted to the selector generation unit 12, for each case number.

The line-A error signals each indicates that a UE is detected by a line-A error checker, and the line-B error signals each indicates that a UE is detected by a line-B error checker. The synchronization error is an error of in synchronization between the lines A and B, and indicates that a comparison result from the comparator 9 indicates a disagreement (i.e., being out of synchronization). Content of the select signal 13 indicates one of signal 5a, signal 5b and an error stop (not selected and a system stop). If the content of the select signal 13 describes that "both of signal 5a and signal 5b are OK", the selector generation unit 12 selects either the signal 5a or signal 5b in accordance with a predetermined determination method because the same operation is obtained regardless of whether the signal 5a or signal 5b is selected. The predetermined determination method is, for example, to select a preset line or a line selected in advance.

FIG. 27 is a flowchart illustrating an operation example when a conventional selector generation unit receives an error signal. The selector generation unit 12 firstly determines whether a notification about a UE has been received or not (S11).

If a notification about a UE has been received (S11, Yes), the selector generation unit 12 determines where the UE has been received from (S21). If the UE is an error from the line A (S21, line-A error), the selector generation unit 12 selects the signal 5b (S22), and this flow ends. Otherwise, if the UE is an error from the line B (S21, line-B error), the selector generation unit 12 selects the signal 5a (S23), and this flow ends. If the UE is an error which has been simultaneously notified of from both the lines A and B (S21, simultaneous), the selector generation unit 12 does not select any signal (S24, error stop), and this flow ends.

If any notification about an UE has not been received (S11, No), the selector generation unit 12 makes a determination on a synchronization check result of the comparator 9 (S61). If no synchronization error occurs (S61, no error), the selector generation unit 12 selects either the signal 5a or signal 5b in accordance with the determination method described previously (S62), and this flow ends. Otherwise, if a synchronization error occurs (S61, synchronization error), the selector generation unit 12 does not select any signal (S63, error stop), and this flow ends.

According to the operation of the selector generation unit 12, if a comparison error is detected or errors are detected on both lines (case number=2, or 5 to 11 as illustrated in FIG. 26), the information processing system stops.

Next, operation of each error checker (the error checkers 7a and 7b, and the error checkers inside the processing devices 2a0, 2a1, 2b0, and 2b1) will be described. FIG. 28 is a flowchart illustrating an operation example of a conventional error checker. The error checker firstly determines what type of error has occurred (S111). If no error has occurred (S111, No Error), the error checker does nothing, and this flow ends. If a UE has occurred (S111, UE), the error checker issues a notification about the UE to the selector generation unit 12 (S112), and this flow ends. If a CE has occurred (S111, CE), the error checker corrects the CE (S113), and this flow ends.

For example, if a UE is detected on the line B, the selector 14 selects the signal 5a in accordance with the operation of the selector generation unit 12 as described above, and separates the line B from which an error has been detected. In a similar manner, if a UE is detected on the line A, the selector 14 selects the signal 5b in accordance with the operation of the selector generation unit 12 as described above, and separates the line A from which an error has been detected. In this manner, the system is protected.

A further description will be made of a case that an error checker detects a CE (correctable error). If each of the lines is given a path for carrying out a CE processing in an interruptive manner, the line where a CE has been detected performs masking of an interruption processing.

Several of conventional techniques relevant to the present invention are fault-tolerant computer devices which shorten a pause of device operation, and a resynchronization method thereof.

[Patent Document 1] Japanese Laid-Open Patent Publication No. 2004-046599

However, there is a case that the mirror mode is weaker against errors than a single mode, in a system in which a UE from the common unit 15 propagates to the lines A and B and an error is recognized by the lines A and B, and which has the selector generation unit 12 performing operation as described above, like in the information processing system described previously.

SUMMARY

According to an aspect of the invention, an information processing device having two processing units capable of operating in synchronization with each other, includes: a common unit capable of outputting an identical signal to the two processing units; detection units that are respectively provided for the processing units and each detects errors occurred in corresponding processing unit respectively; a comparison unit that compares outputs from the two processing units; and a control unit that controls signals from the processing units to the common unit, based on a detection result of the detection units and a comparison result of the comparison unit, and determines, if errors of an identical type are simultaneously detected by the detection units, that the errors are due to an error of the common unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 is a table illustrating an operation example of receiving a UE signal by a selector generation unit according to the first embodiment;

FIG. 8 is a table illustrating an operation example of receiving a CE signal by a selector generation unit according to the third embodiment;

FIG. 26 is a table illustrating an operation example of receiving a UE signal by a conventional selector generation unit;

FIG. 27 is a flowchart illustrating an operation example of receiving an error signal by the conventional selector generation unit.

DESCRIPTION OF EMBODIMENTS

There is a case that the mirror mode is weaker against errors than the single mode, in a system in which a UE from the common unit 15 propagates to the lines A and B and an error is recognized by the lines A and B, and which has the selector generation unit 12 performing operation as described above, like in the information processing system described previously.

Described below will be a case that the processing device 2a0 incapable of recognizing poisoning data reads resources in the common unit 15, targeting a UE. The poisoning data is data which is marked to indicate that an error has been detected if the error is detected in the data. In the case of the single mode, if a read target is UE when the processing device 2a0 reads the common unit 15, the common unit 15 poisons the data and returns the data to the processing device 2a0. Since the processing device 2a0 cannot recognize poisoning data, the error checker inside the processing device 2a0 recognizes the data as a UE, and can accordingly determine whether recording of an error log and continuation of the system are possible or not. In contrast, in the case of the mirror mode, if the common unit 15 returns poisoning data and if the error checkers inside the processing devices 2a0 and 2b0 simultaneously recognize UEs, signals 11a0 and 11b0 are simultaneously asserted because a UE is an error which is a target to cause separation of a line. The system then stops.

If each of the lines is given a path for carrying out a CE processing in an interruptive manner when a CE is detected, recording of a CE log and continuation of the system are possible upon detection of a CE signal, in the single mode. However, masking for an interruption processing for a CE is carried out in the mirror mode, and therefore, recording of a CE log cannot be carried out. This is because, if an interruption processing is inserted in on a line in order to record an error log, both of the lines cannot be mutually synchronized any more. However, the recording of an error log is very important from a viewpoint of predictive monitoring. Therefore, there is a harmful influence on reliability of the mirror mode.

Hereinafter, embodiments of the invention will be described with reference to the drawings.

First Embodiment

At first, a configuration of an information processing system (information processing device) according to an embodiment of the invention will be described.

Figure 1:
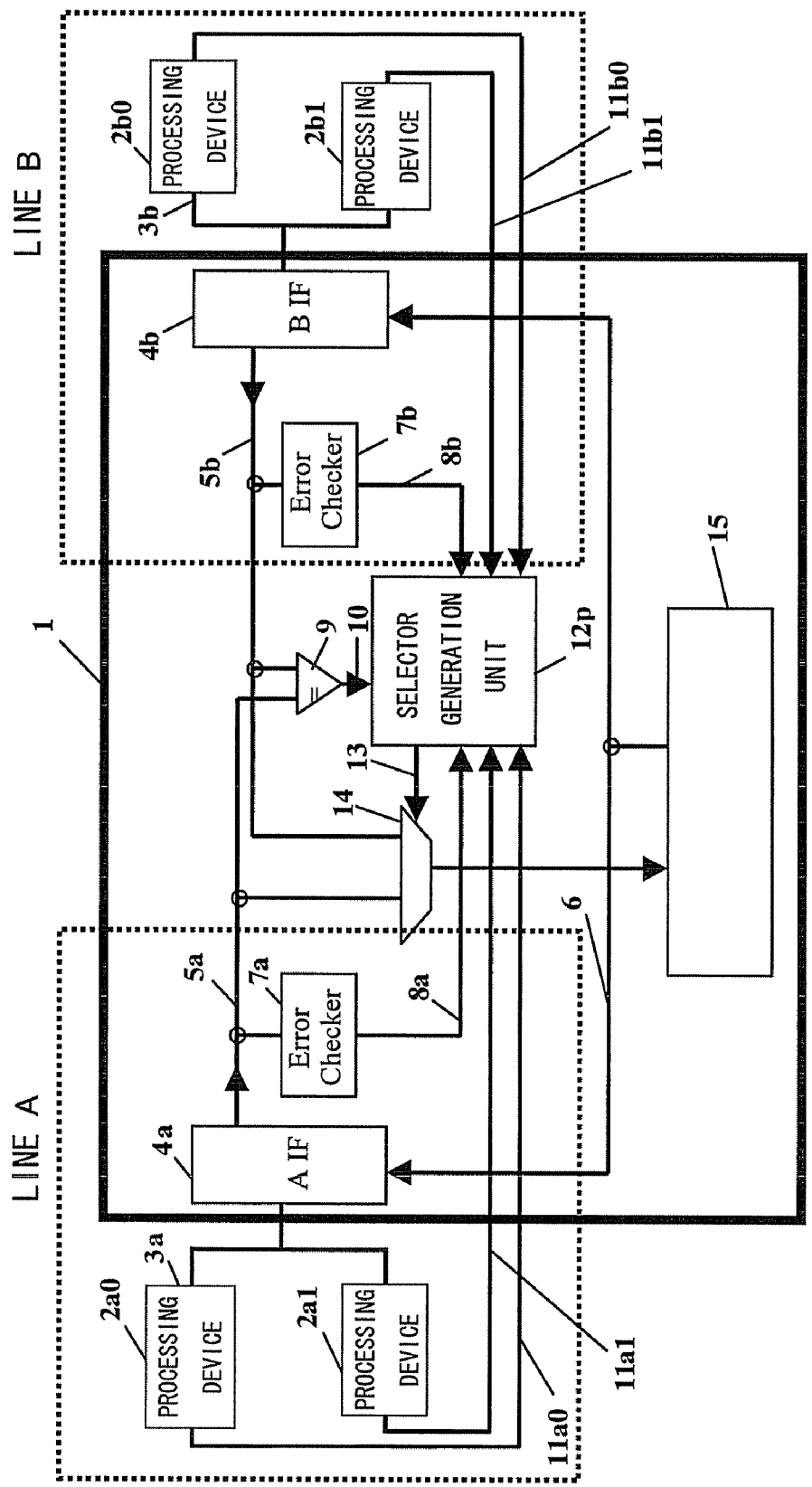
FIG. 1 is a block diagram illustrating a configuration example of an information processing system according to a first embodiment of the invention.
Figure 25:
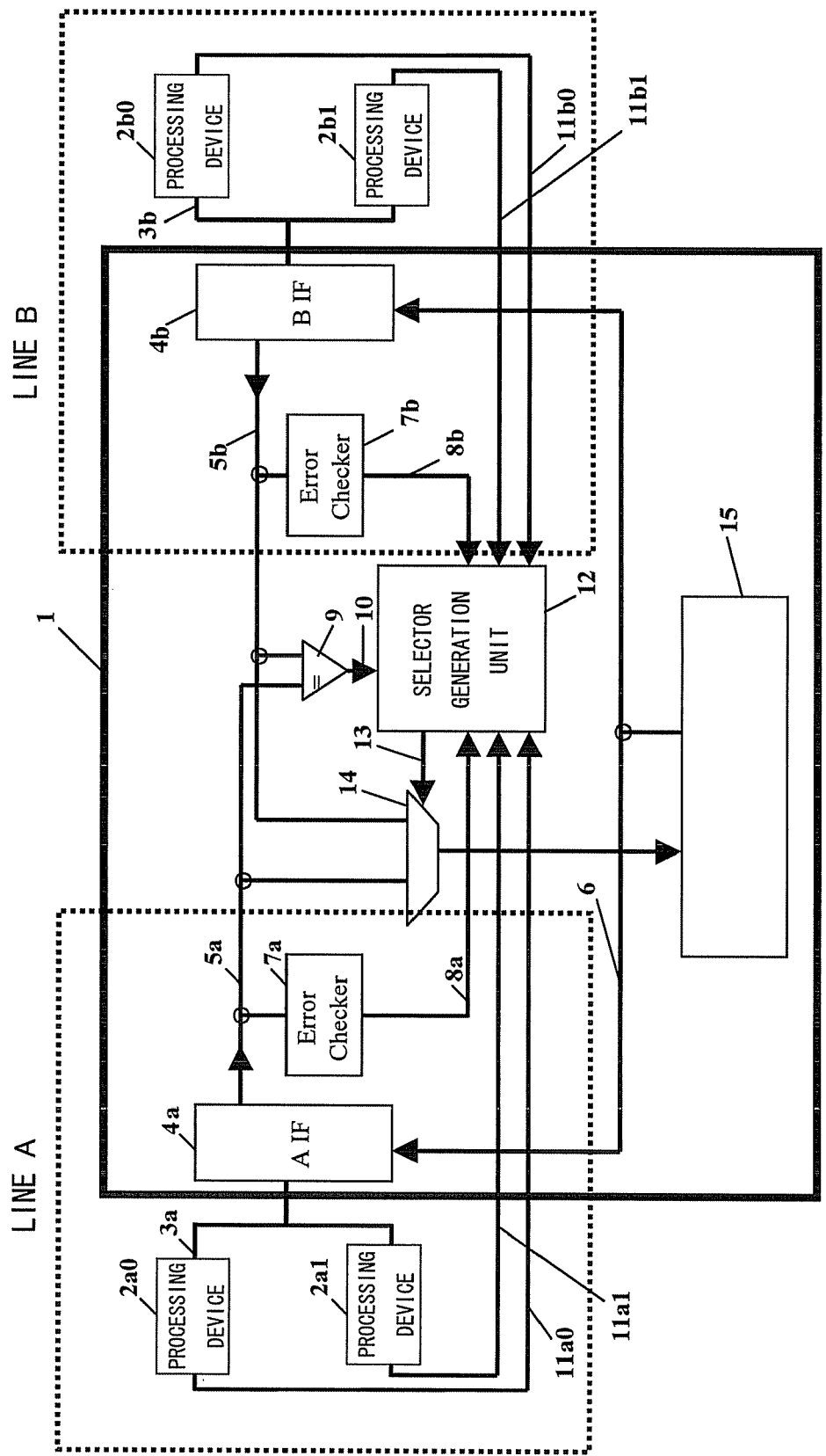
FIG. 25 is a block diagram illustrating a configuration example of a conventional information processing system.

FIG. 1 is a block diagram illustrating a configuration example of the information processing system according to this embodiment. In this figure, common reference symbols to FIG. 25 denote the same or equivalent components as or to those in FIG. 25, descriptions of which will be omitted herefrom. Compared with FIG. 25, FIG. 1 includes a selector generation unit 12p in place of the selector generation unit 12.

Next, operation of the information processing system according to this embodiment will be described.

As in the conventional information processing system described previously, the information processing system recognizes errors on lines A and B through which UEs of a common unit 15 propagate.

Described next is an operation of receiving an error signal by the selector generation unit 12p.

FIG. 2 is a table illustrating an operation example of receiving a UE signal by the selector generation unit according to this embodiment. This figure is similar to FIG. 26 but differs in that, if UEs are detected on the lines A and B and if there is no comparison error (case number=5, 7, or 9 illustrated in FIG. 2), either the signal 5a or signal 5b is selected in accordance with the determination method described previously.

Figure 3:
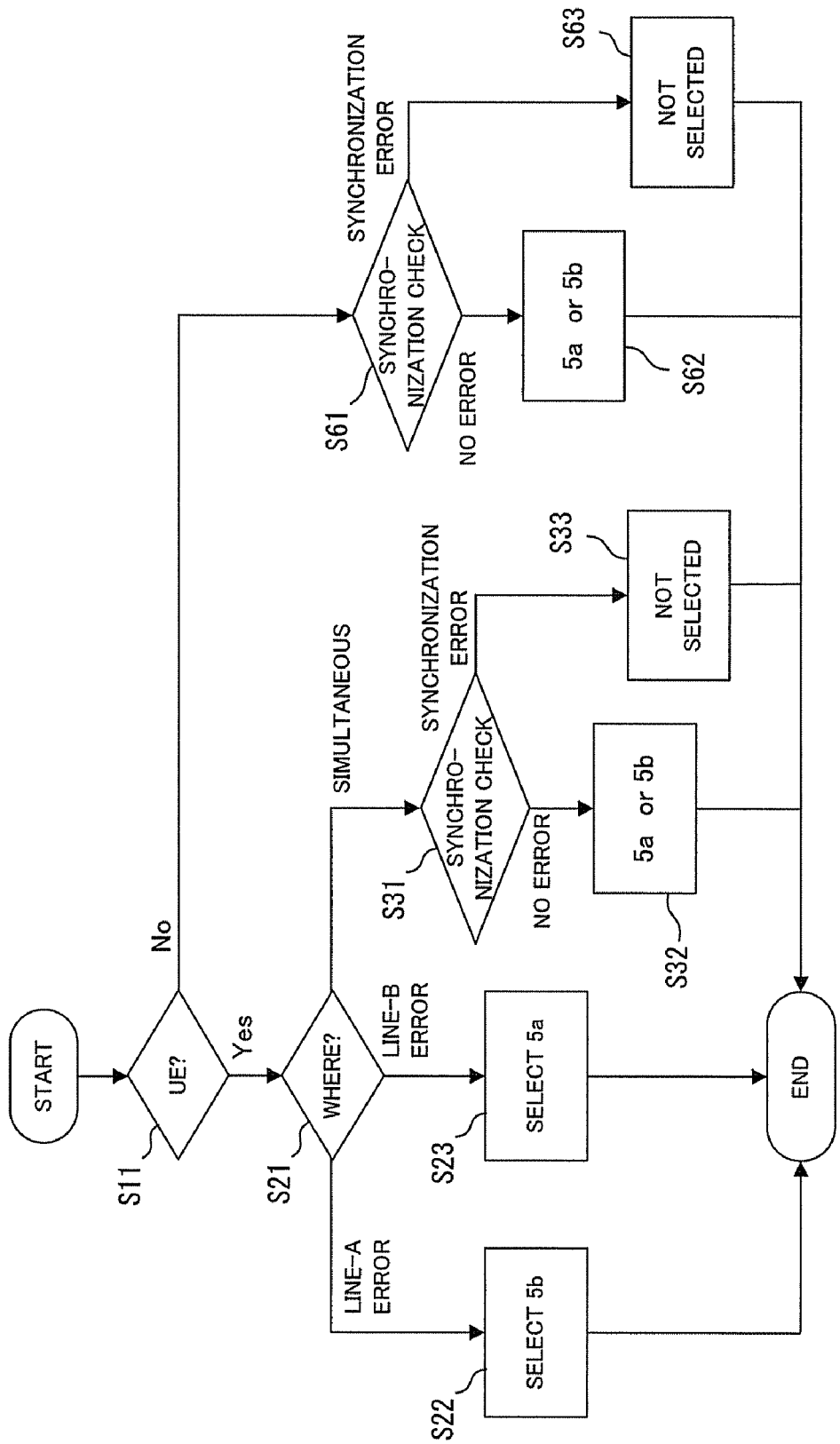
FIG. 3 is a flowchart illustrating an operation example of receiving an error signal by the selector generation unit according to the first embodiment.

FIG. 3 is a flowchart illustrating an operation example of receiving an error signal by the selector generation unit according to this embodiment. In this figure, common reference symbols to FIG. 27 denote the same or equivalent components as or to those in FIG. 27, descriptions of which will be omitted herefrom. Compared with FIG. 27, a processing step S31 is executed in this figure, in place of the processing step S24. In a processing step S21, if UEs are errors received simultaneously from both the lines A and B (S21, simultaneous), the selector generation unit 12p makes a determination on a synchronization check result from the comparator 9 (S31). If there is no synchronization error (S31, no error), the selector generation unit 12p selects either the signal 5a or signal 5b in accordance with the method described previously (S32), and this flow then ends. Otherwise, if there is a synchronization error (S31, synchronization error), the selector generation unit 12p does not select any signal (S33, error stop), and this flow then ends.

Figure 28:
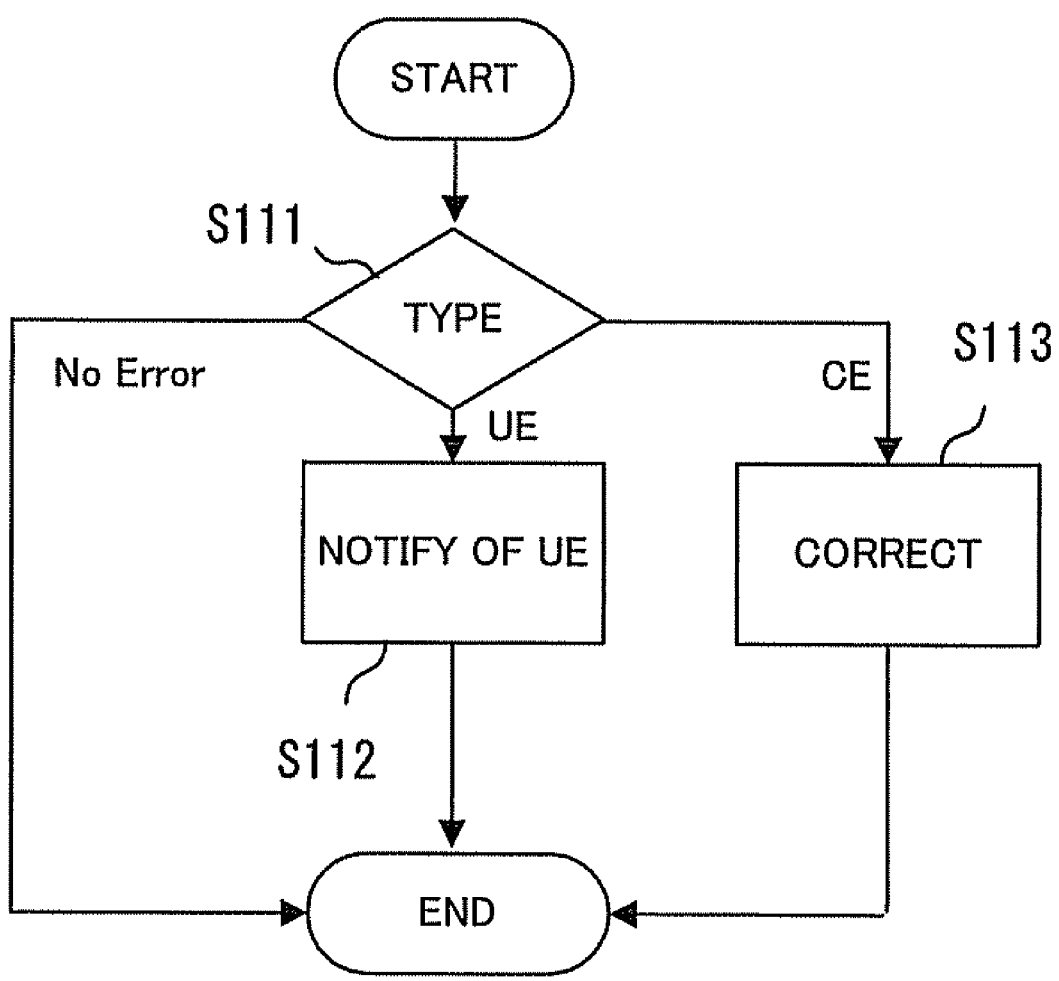
FIG. 28 is a flowchart illustrating an operation example of a conventional error checker.

Each of error checkers (the error checkers 7a and 7b and the error checkers inside the processing devices 2a0, 2a1, 2b0, and 2b1) operates in the same manner as the error checker illustrated in FIG. 28.

According to the selector generation unit 12p described above, for example, the processing devices 2a0 and 2b0 read resources in the common unit 15. If UD is detected from a target thereof, the system is not stopped by the selector 14, unlike in the conventional information processing system described previously, but the UE is recognized as a common unit error even if both the lines A and B simultaneously detect UEs.

Even if errors are simultaneously detected on the lines A and B for some other reason, an error stop is determined in case of a comparison error (case number=6, 8, or 10 as illustrated in FIG. 2) as a result of a synchronization check performed by the comparator 9. Reliability of the system is therefore not damaged.

According to this embodiment, if a common unit error which does not necessitate stop of the system propagates to the lines A and B, the error which has propagates to the lines A and B can be recognized to be a common unit error, leading to improvement in reliability of the mirror mode.

Second Embodiment

At first, a description will be made of the configuration of the information processing system (information processing device) according to a second embodiment.

Figure 4:
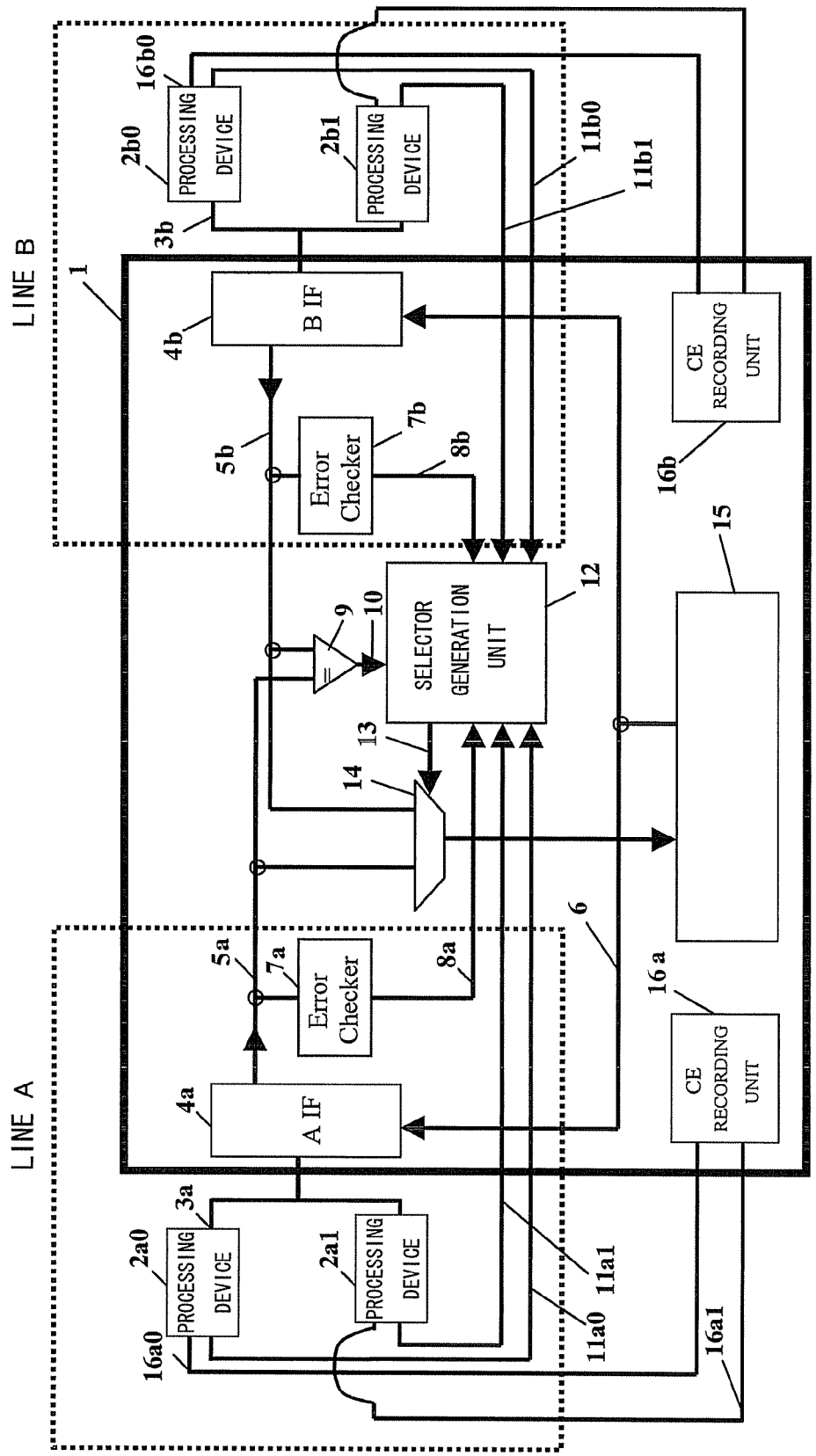
FIG. 4 is a block diagram illustrating a configuration example of an information processing system according to a second embodiment of the invention.

FIG. 4 is a block diagram illustrating a configuration example of the information processing system according to this embodiment. In this figure, common reference symbols to FIG. 25 denote the same or equivalent components as or to those in FIG. 25, descriptions of which will be omitted herefrom. Compared with FIG. 25, CE recording units 16a and 16b are newly provided in this figure. The CE recording unit 16a records logs of CEs detected by an error checker 7a and error checkers in the processing devices 2a0 and 2a1. Similarly, the CE recording unit 16b records logs of CEs detected by an error checker 7b and error checkers inside the processing devices 2b0 and 2b1. The logs recorded on the CE recording units 16a and 16b are read from outside the information processing system.

Figure 5:
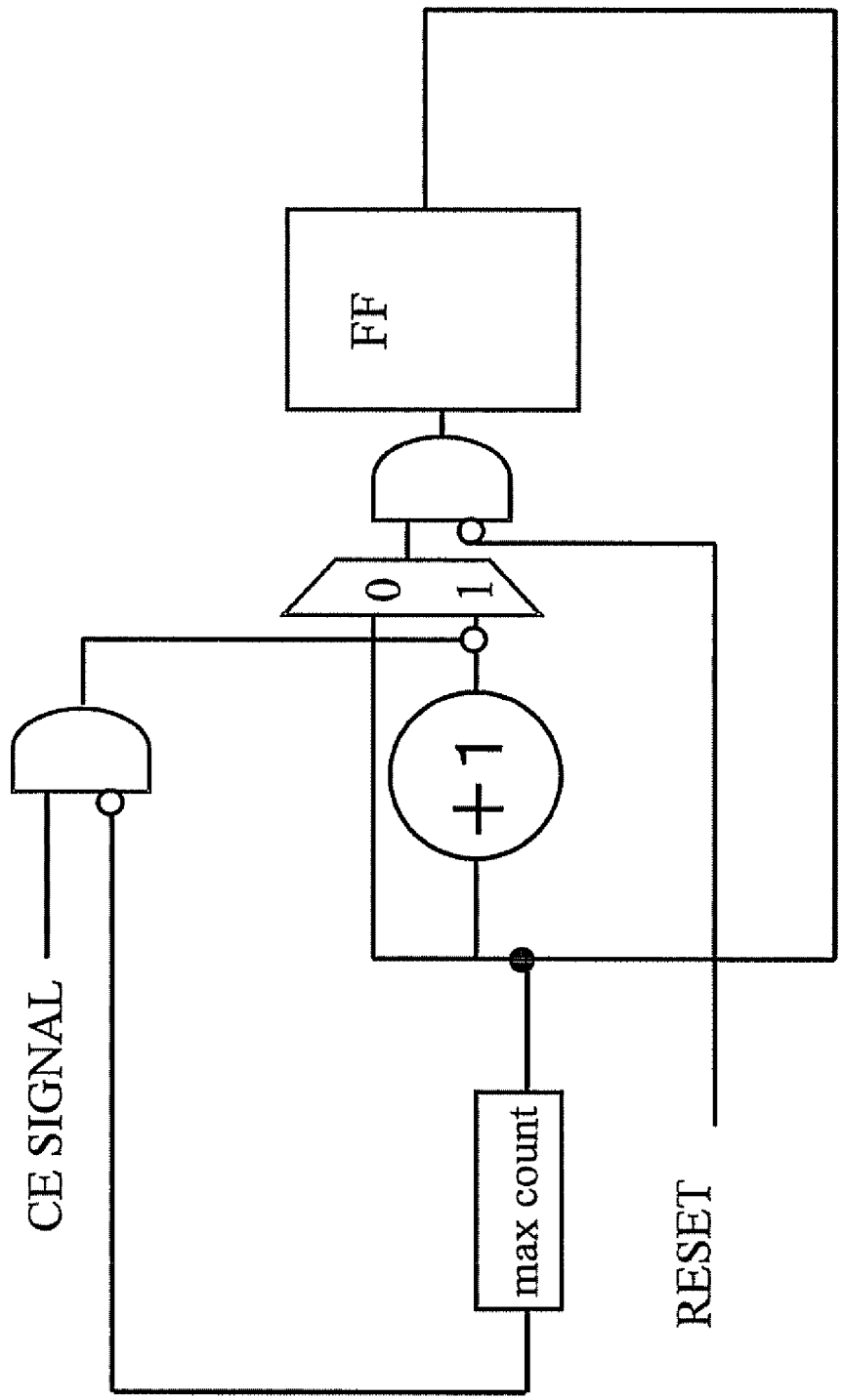
FIG. 5 is a circuit diagram illustrating a configuration example of a CE recording unit according to the second embodiment.

FIG. 5 is a circuit diagram illustrating a configuration example of the CE recording units according to this embodiment. As illustrated in this figure, each of the CE recording units 16a and 16b is constituted by a simple counter circuit. The circuit counts and holds a number of errors by using a counter and a FF (flip-flop) each time when a CE signal is received. When the number of errors reaches a value Max, the circuit then keeps holding the number Max.

Figure 6:
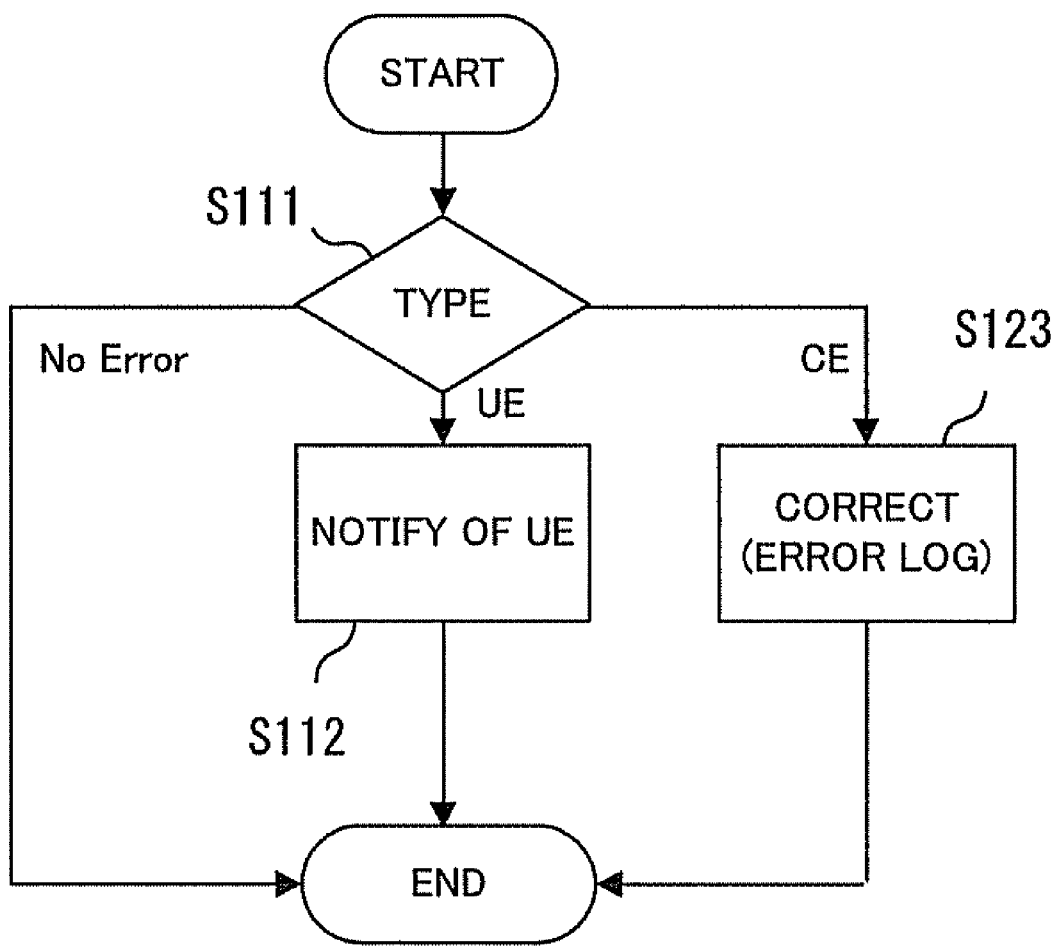
FIG. 6 is a flowchart illustrating an operation example of an error checker according to the second embodiment.

Described next is an operation of each of error checkers (the error checkers 7a and 7b and the error checkers inside the processing devices 2a0, 2a1, 2b0, and 2b1). FIG. 6 is a flowchart illustrating an operation example of error checkers according to this embodiment. In this figure, common reference symbols to FIG. 28 denote the same or equivalent components as or to those in FIG. 28, descriptions of which will be omitted herefrom. Compared with FIG. 28, a processing step S123 is executed in this figure, in place of the processing step S113. In the processing step S111, if a CE occurs (S111, CE), the error checker corrects the CE and causes a connected CE recording unit to record an error log (S123). This flow then ends.

According to this embodiment, the lines A and B are provided with the CE recording units. Therefore, when a CE signal is detected by the line A or B, the CE signal is corrected while recording a log of the CE, so that the system is kept running without separating any line. Accordingly, actualization of collection of error logs, and application to predictive monitoring of hardware errors by using content of errors can be expected and lead to improvement in reliability of the mirror mode.

Third Embodiment

At first, a description will be made of the configuration of an information processing system (information processing device) according to a third embodiment.

In the information processing system according to this embodiment, resynchronization is possible even after a line A or line B is separated from the control system, and each of the lines has a mechanism of recording logs of CEs when CEs are detected.

Figure 7:
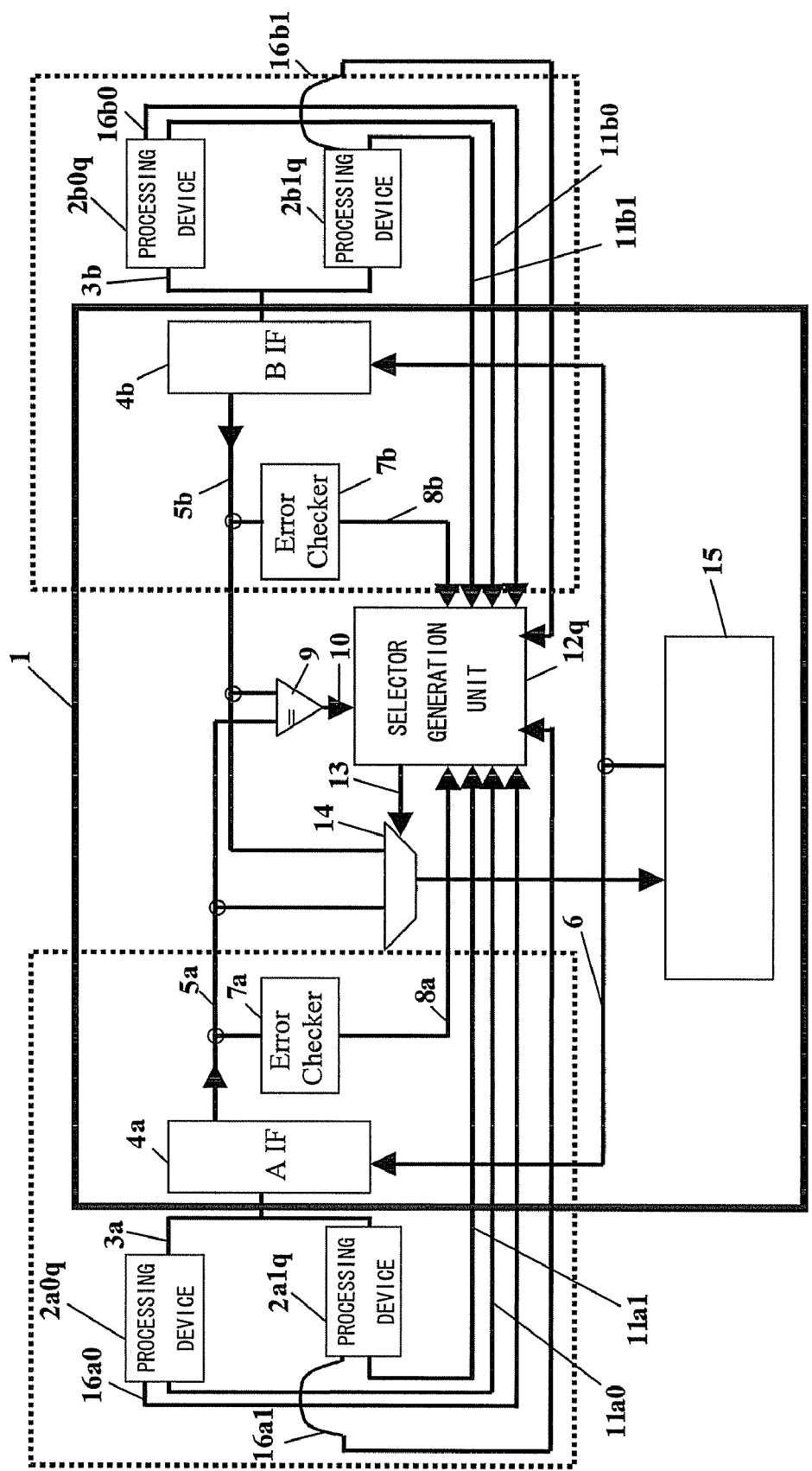
FIG. 7 is a block diagram illustrating a configuration example of an information processing system according to a third embodiment of the invention.

FIG. 7 is a block diagram illustrating a configuration example of the information processing system according to this embodiment. In this figure, common reference symbols to FIG. 25 denote the same or equivalent components as or to those in FIG. 25, descriptions of which will be omitted herefrom. Compared with FIG. 25, a selector generation unit 12q is provided in this figure, in place of the selector generation unit 12. Processing devices 2a0q, 2a1q, 2b0q, and 2b1q are provided respectively in place of the processing devices 2a0, 2a1, 2b0, and 2b1. Further, there are provided a signal 16a0 for notifying the selector generation unit 12q of an error which has occurred in the processing device 2a0q, a signal 16a1 for notifying the selector generation unit 12q of an error which has occurred in the processing device 2a1q, a signal 16b0 for notifying the selector generation unit 12q of an error which has occurred in the processing device 2b0q, and a signal 16b1 for notifying the selector generation unit 12q of an error which has occurred in the processing device 2b1q.

The processing devices 2a0q, 2a1q, 2b0q, and 2b1q are, for example, CPUs each of which has a CE recording function to record logs of CEs in an interruptive manner when CEs are detected.

Next, operation of the information processing system according to this embodiment will be described.

Described first is an operation of receiving a CE signal by the selector generation unit 12q.

FIG. 8 is a table illustrating an operation example of receiving a CE signal by the selector generation unit according to this embodiment. This table represents content of a select signal 13 as outputted from the selector generation unit 12q in relation to content of line-A error signals (signals 16a0 and 16a1), line-B error signals (signals 16b0 and 16b1), and synchronization errors (a comparison error and a signal 10), for each case number. The content of the select signal 13 represents the signal 5a, signal 5b, or error stop. If the content of the select signal 13 describes that "both of 5a and 5b are OK", the selector generation unit 12q may select either the signal 5a or 5b, and therefore, selects one of the signals 5a and 5b in accordance with the method described previously.

Figure 9:
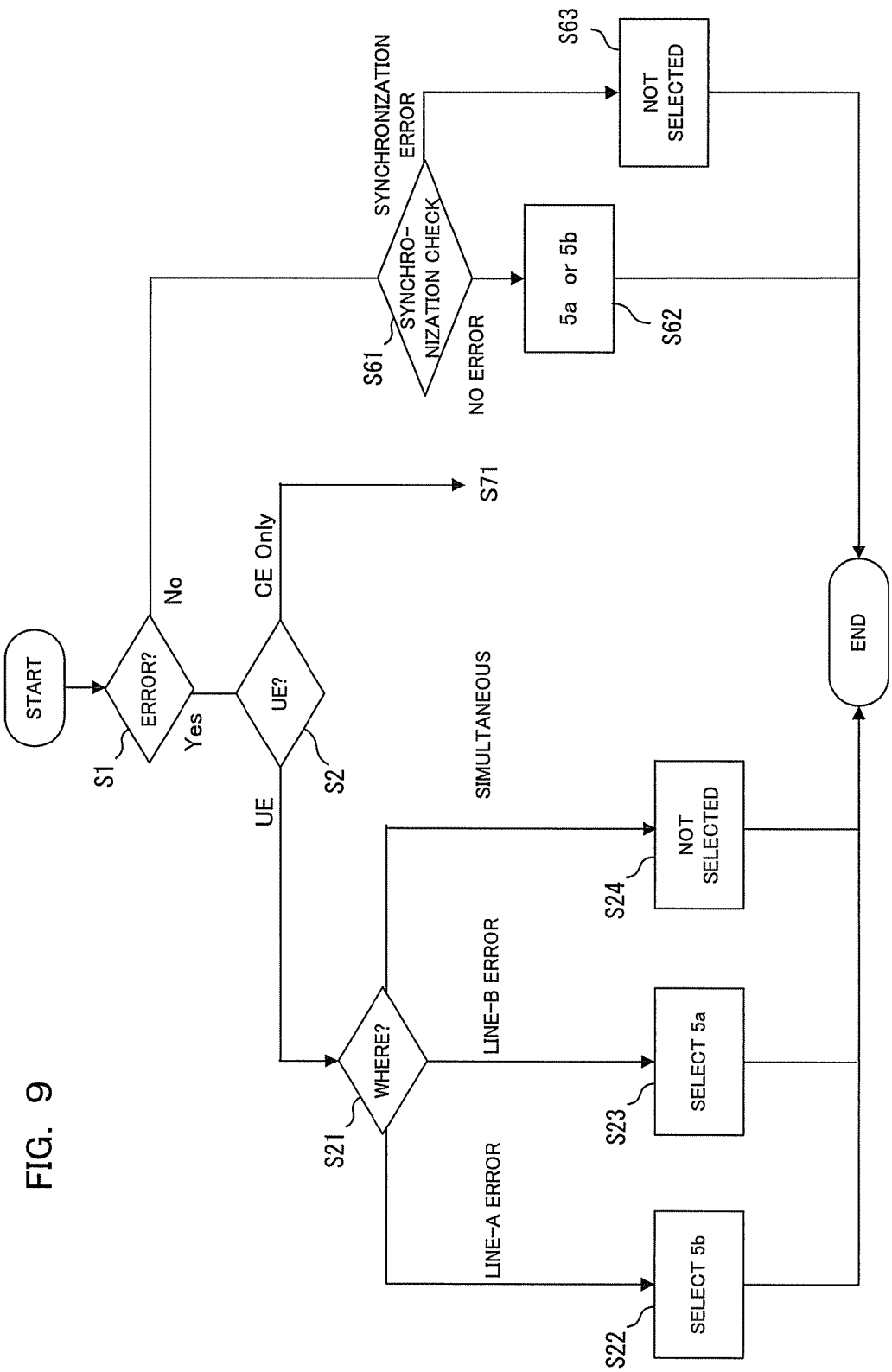
FIG. 9 is a flowchart illustrating a first processing in operation of receiving an error signal by the selector generation unit according to the third embodiment.
Figure 10:
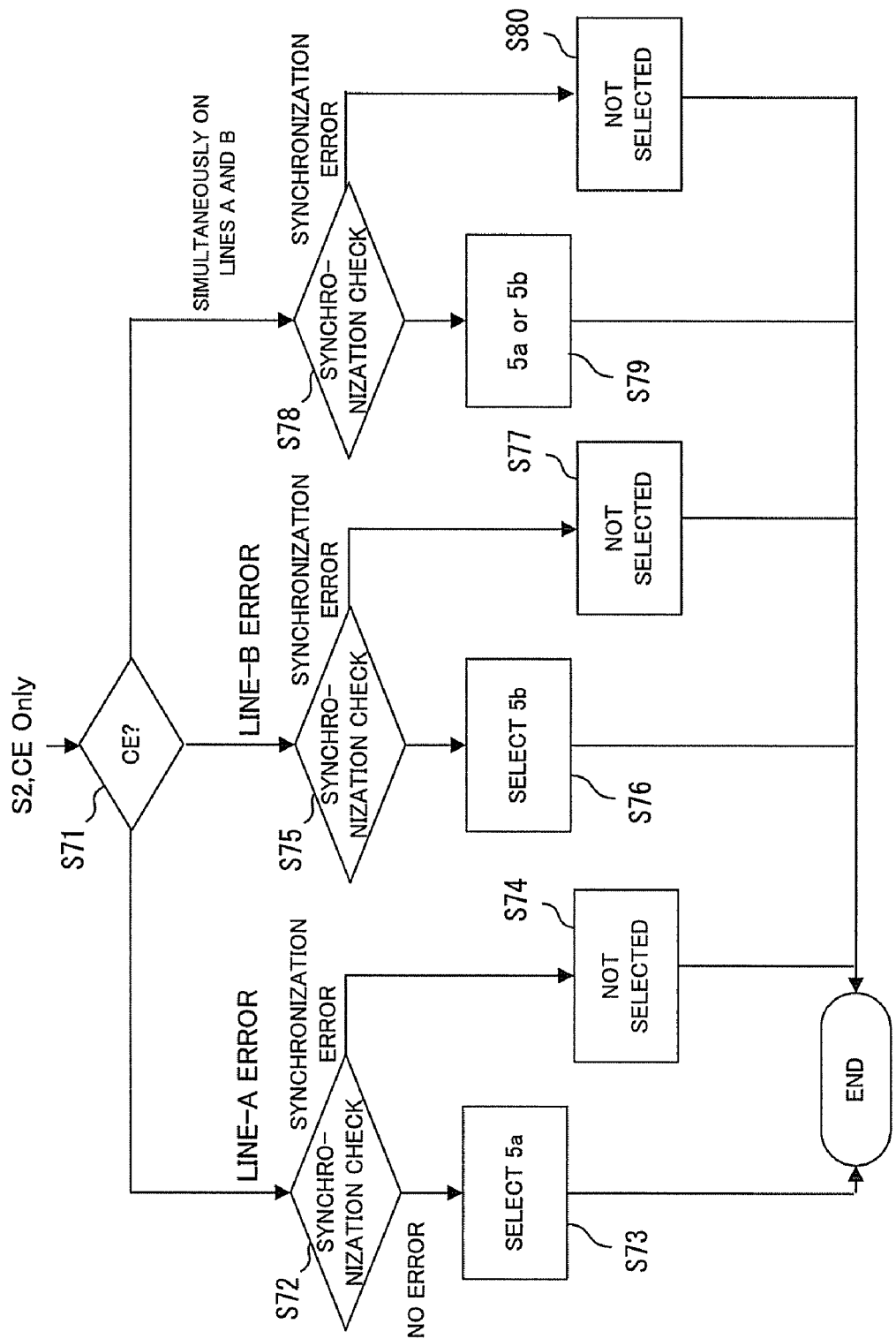
FIG. 10 is a flowchart illustrating a second processing in the operation of receiving an error signal by the selector generation unit according to the third embodiment.

FIG. 9 is a flowchart illustrating a first processing in the operation of receiving an error signal by the selector generation unit according to this embodiment. FIG. 10 is a flowchart illustrating a second processing in the operation of receiving an error signal by the selector generation unit according to this embodiment. In FIGS. 9 and 10, common reference symbols to FIG. 27 denote the same or equivalent components as or to those in FIG. 27, descriptions of which will be omitted herefrom. Firstly, the selector generation unit 12q determines whether a notification about an error has been received or not (S1).

If a notification about an error has been received (S1, Yes), the selector generation unit 12q determines whether the notification includes a UE or not (S2). If a UE is included in the notification (S2, UE), the selector generation unit 12q executes the same processing as the conventional processing from the processing step S21 thereof. If a CE is included in the notification (S2, CE Only), the selector generation unit 12q determines where the CE has occurred (S71).

If the CE is an error from the line A in the processing step S71 (S71, line-A error), the selector generation unit 12q determines a synchronization check result from the comparator 9. If there is no synchronization error (S72, no error), the selector generation unit 12q selects the signal 5a (S73). If there is a synchronization error (S72, synchronization error), no signal is selected (S74, error stop) and this flow ends.

Alternatively, if the CE is an error from the line B in the processing step S71 (S71, line-B error), the selector generation unit 12q makes a determination on a synchronization check result from the comparator 9. If there is no synchronization error (S75, no error), the selector generation unit 12q selects the signal 5b (S76). Otherwise, if there is a synchronization error (S75, synchronization error), no signal is selected (S77, error stop) and this flow ends.

Also alternatively, if the CE is an error which has been simultaneously notified of from both the lines A and B (S71, simultaneous), the selector generation unit 12q makes a determination on a synchronization check result from the comparator 9. If there is no synchronization error (S78, no error), either the signal 5a or 5b is selected in accordance with the method described previously (S79). Otherwise, if there is a synchronization error (S78, synchronization error), no signal is selected (S80, error stop) and this flow ends.

If no notification about an error has been received (S1, No), the selector generation unit 12*q* executes the same processing as the conventional processing from the processing step S61 thereof.

Figure 11:
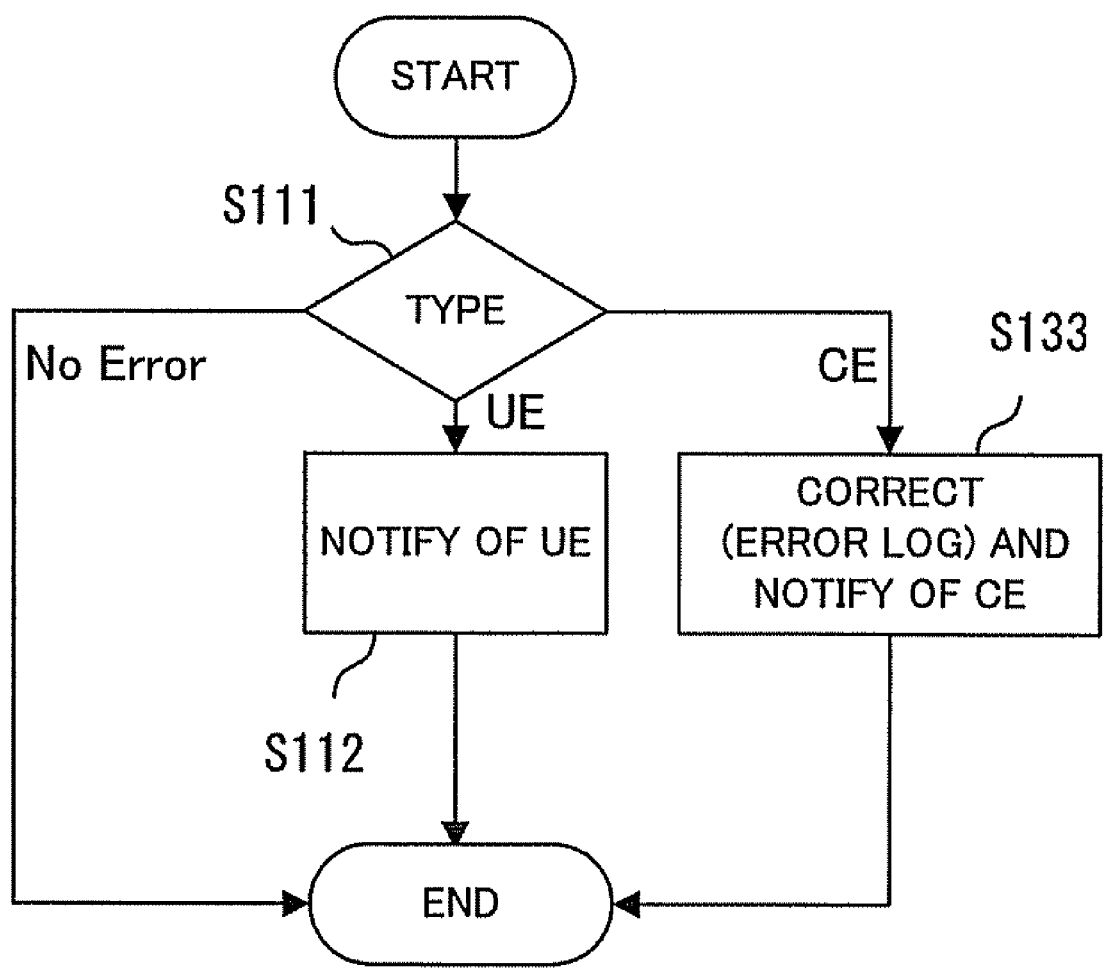
FIG. 11 is a flowchart illustrating an operation example of an error checker according to the third embodiment.

Described next is an operation of each of error checkers (error checkers 7*a* and 7*b*, and error checkers inside the processing devices 2*a*0*q*, 2*a*1*q*, 2*b*0*q*, and 2*b*1*q*). FIG. 11 is a flowchart illustrating an operation example of an error checker according to this embodiment. In this figure, common reference symbols to FIG. 28 denote the same or equivalent components as or to those in FIG. 28, descriptions of which will be omitted herefrom. Compared with FIG. 28, a processing step S133 is executed in this figure, in place of the processing step S113. If a CE occurs (S111, CE), an error checker corrects the CE and notifies a connected selector generation unit 12*q* of the CE (S133). This flow then ends.

The error checker in the processing device 2*a*0*q* sends an error signal 16*a*0 to the selector generation unit 12*q* when a CE is detected. The selector generation unit 12*q* which has received the CE signal selects a signal 5*a* for the line-A from which an error has been detected and separates the line B from which no error has been detected, from the system. Thereafter, the processing device 2*a*0*q* on the line where an error has been detected corrects the CE signal, and an error log is recorded in an interruptive manner owing to the CE recording function.

After recording the log, the selector generation unit 12*q* connects the separated line B again to the system, and resynchronizes both lines. Therefore, synchronization of the system is maintained while recording logs of CEs. Since the processing devices records logs of CEs, there is no need of a mechanism for externally reading CE logs from outside. Therefore, the CE recording unit as used in the second embodiment need not be inserted.

Next, an operation example of resynchronization will be described.

In the following, operation of the resynchronization will be described referring to an example in which the information processing system according to this embodiment is expressed as a system board (SB) 60, the processing devices 2*a*0*q*, 2*a*1*q*, 2*b*0*q*, and 2*b*1*q* are respectively expressed as CPU 70, CPU 71, CPU 72, and CPU 73, and the control system 1 is expressed as a north bridge 80, respectively.

Resynchronization in this embodiment is a technique of resynchronizing a CPU in a short time (within a timeout detection period of an OS) to achieve resynchronization while the OS is running.

Figure 12:
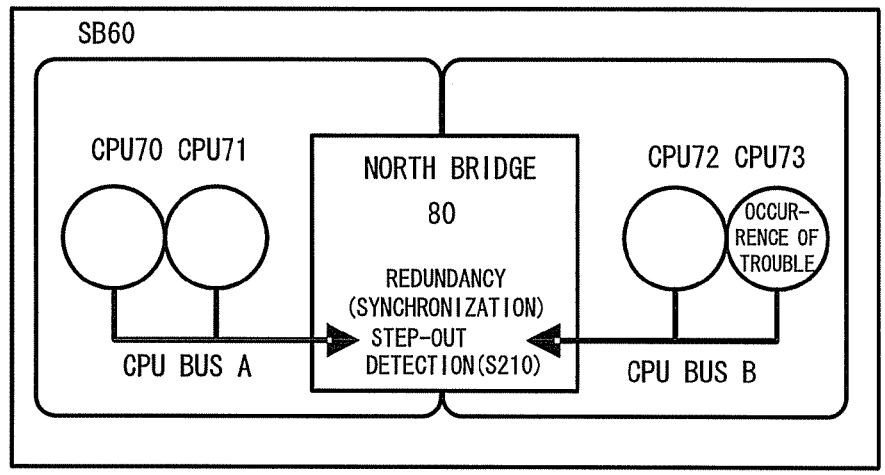
FIG. 12 is a block diagram illustrating operation of a processing step S210 on a system board according to the third embodiment.

At first, the north bridge 80 detects a step-out of redundancy (synchronization) due to an error of the CPU on one line (S210). FIG. 12 is a block diagram illustrating operation of a processing step S210 on a system board according to this embodiment. This figure illustrates a case that a problem occurs in the CPU 72 on the line B. The CPUs 70 and 72 constitute a redundant CPU pair based on synchronous operation, as well as the CPUs 71 and 73 a redundant CPU pair.

Figure 13:
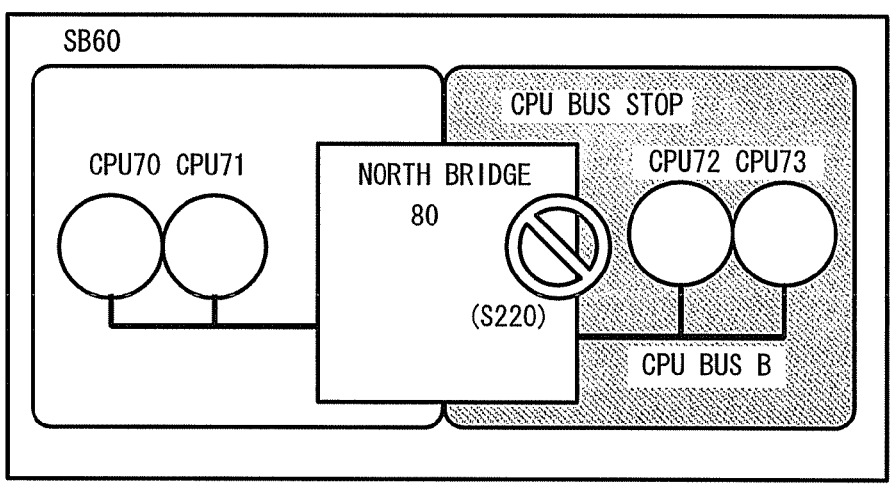
FIG. 13 is a block diagram illustrating operation of a processing step S220 on the system board according to the third embodiment.

Next, the north bridge 80 stops operation of the CPU bus connected to the problematic CPU 72, and also stops commands from being thereafter issued from the CPU bus (S220). FIG. 13 is a block diagram illustrating operation of the processing step S220 on the system board according to this embodiment.

Figure 14:
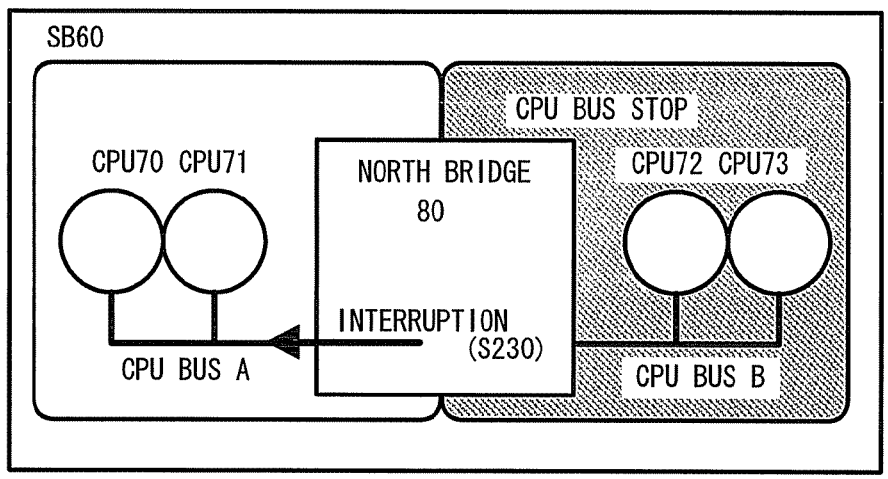
FIG. 14 is a block diagram illustrating operation of a processing step S230 on the system board according to the third embodiment.

Next, the north bridge 80 notifies the other paired normal CPU bus constituting the redundant structure of the stop of one line (S230). FIG. 14 is a block diagram illustrating operation of the processing step S230. The north bridge 80 hereby notifies the normal CPUs 70 and 71 of the stop of the line B.

Figure 15:
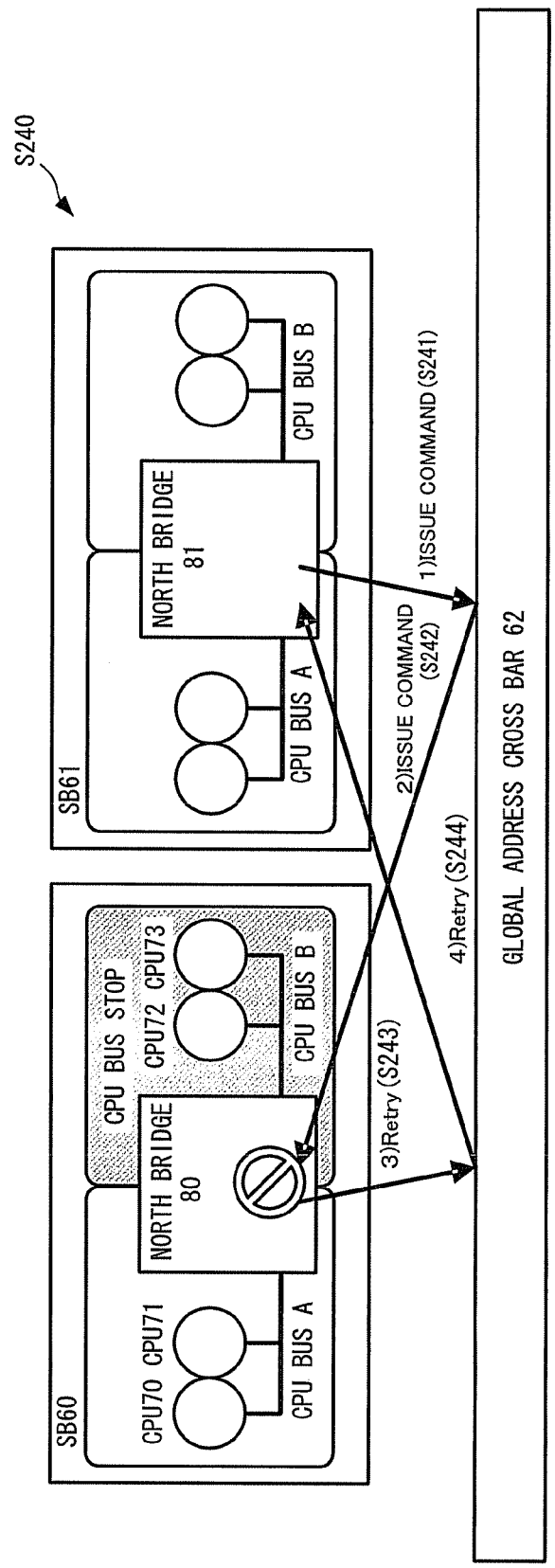
FIG. 15 is a block diagram illustrating operation of a processing step S240 on the system board according to the third embodiment.

Next, to restrict commands from outside, the north bridge 80 continues to retry external commands (S240). FIG. 15 is a block diagram illustrating operation of the processing step S240 on the system board according to this embodiment. As illustrated in this figure, the north bridge 80 on the system board 60 is connected to the north bridge 81 on the system board (SB) 61 through a global address cross bar 62. If the north bridge 81 on the system board 61 issues a command to the system board 60, the command is sent through the global address cross bar 62 (S241) to the system board 60 (S242). The north bridge 80 on the system board 60, which receives the command, then issues Retry for the system board 61. This Retry is sent through the global address cross bar 62 (S243) to the system board 61 (S244).

Figure 16:
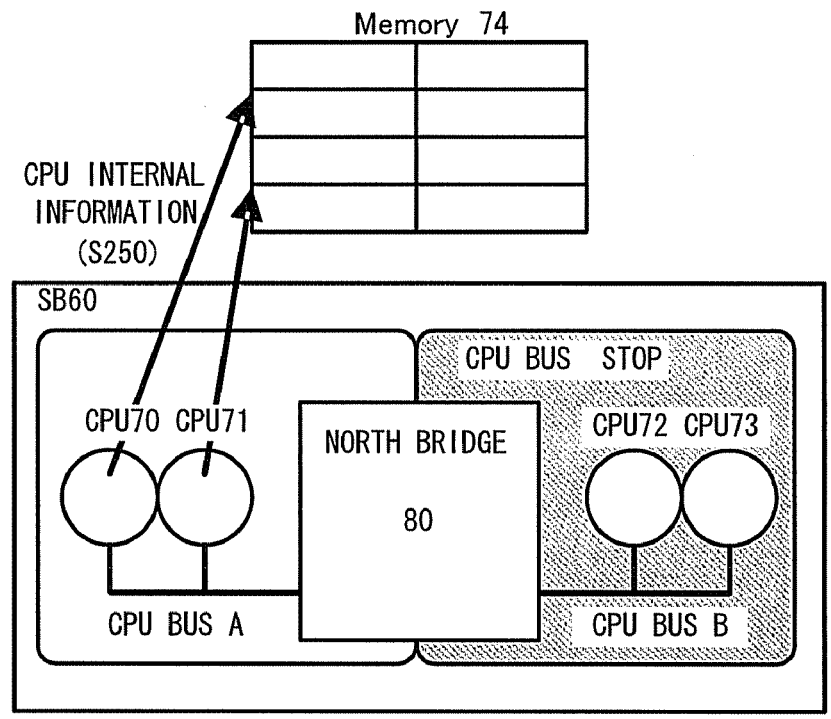
FIG. 16 is a block diagram illustrating operation of a processing step S250 on the system board according to the third embodiment.

Next, the north bridge 80 issues a firmware instruction so as to retract CPU internal information which is least necessary for resynchronization, into the memory from the normal CPUs (S250). FIG. 16 is a block diagram illustrating operation of the processing step S250 on the system board according to this embodiment. The north bridge 80 hereby instructs the normal CPUs 70 and 71 to retract CPU internal information into the memory 74.

Figure 17:
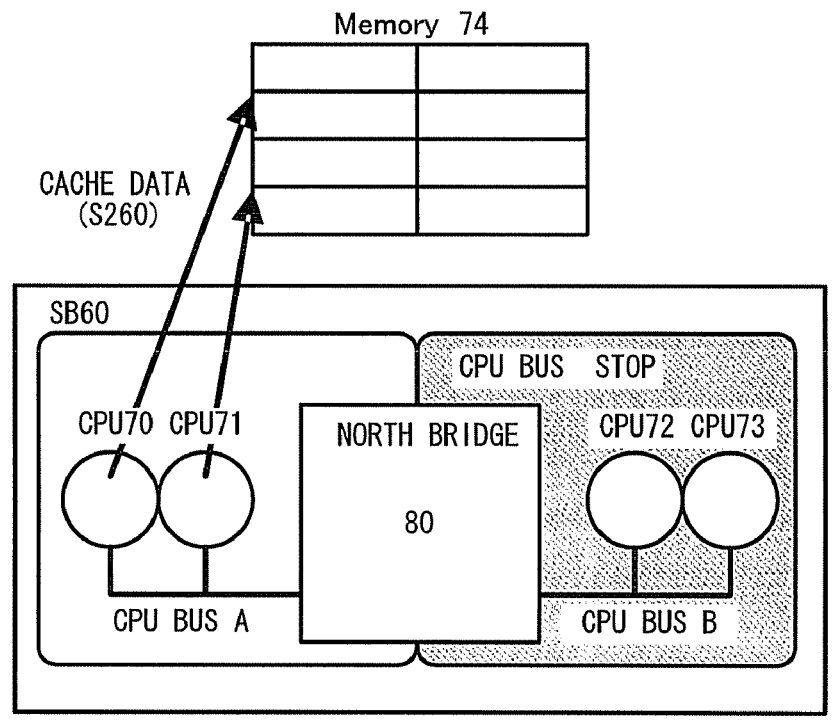
FIG. 17 is a block diagram illustrating operation of a processing step S260 on the system board according to the third embodiment.

Next, the normal CPUs 70 and 71 which have received the instruction from the north bridge 80 writes cache data (CPU internal information) into the memory 74 in accordance with the instruction (S260). FIG. 17 is a block diagram illustrating operation of the processing step S260 on the system board according to this embodiment.

Figure 18:
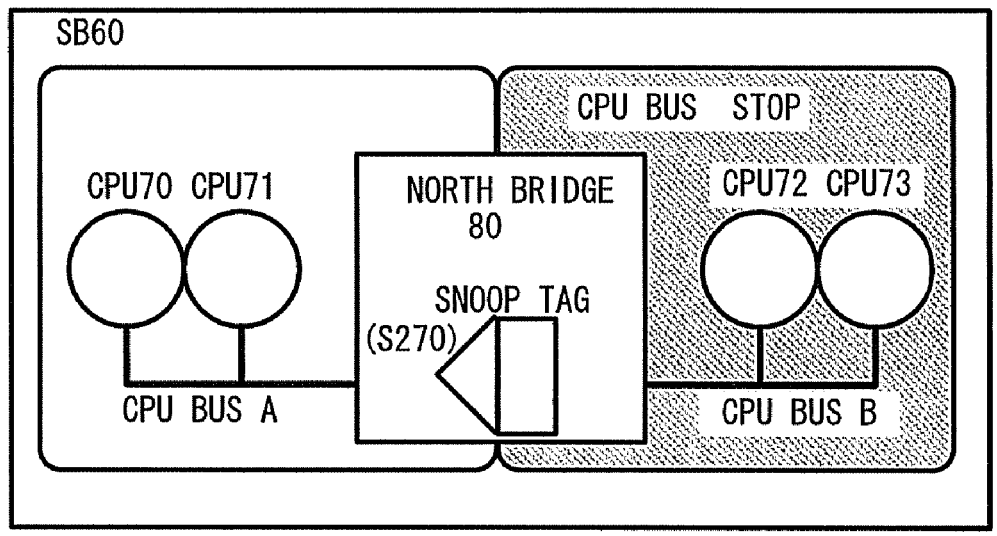
FIG. 18 is a block diagram illustrating operation of a processing step S270 on the system board according to the third embodiment.

Next, the north bridge 80 then clears a snoop tag (cache state information of respective CPUs) in the north bridge 80 at the time when writing of cache data from all normal CPUs into the memory is completed (S270). FIG. 18 is a block diagram illustrating operation of the processing step S270 on the system board according to this embodiment.

Figure 19:
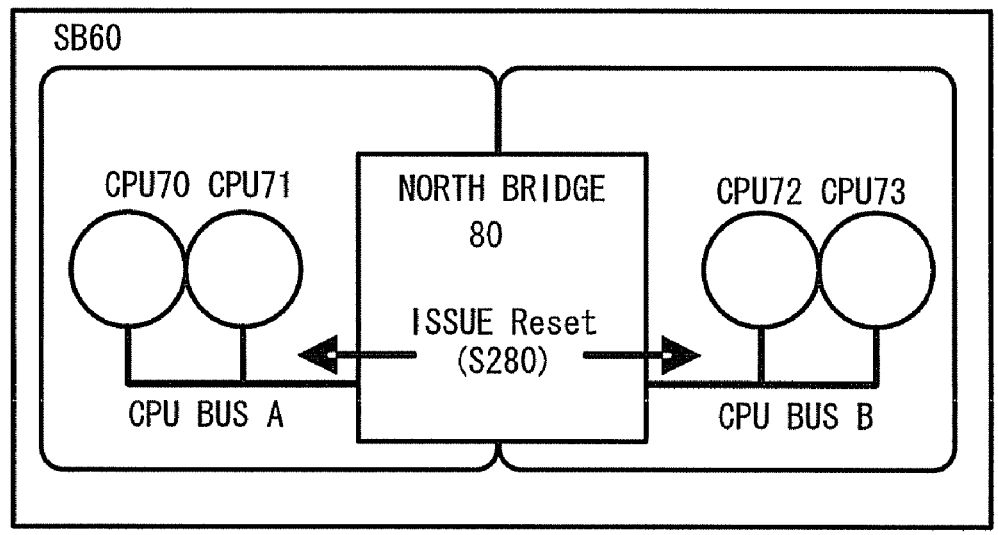
FIG. 19 is a block diagram illustrating operation of a processing step S280 on the system board according to the third embodiment.

Next, the north bridge 80 issues CPU Reset simultaneously for each of the CPUs 70, 71, 72, and 73, and thereby restarts synchronous operation of the CPUs (S280). FIG. 19 is a block diagram illustrating operation of the processing step S280 on the system board according to this embodiment.

Figure 20:
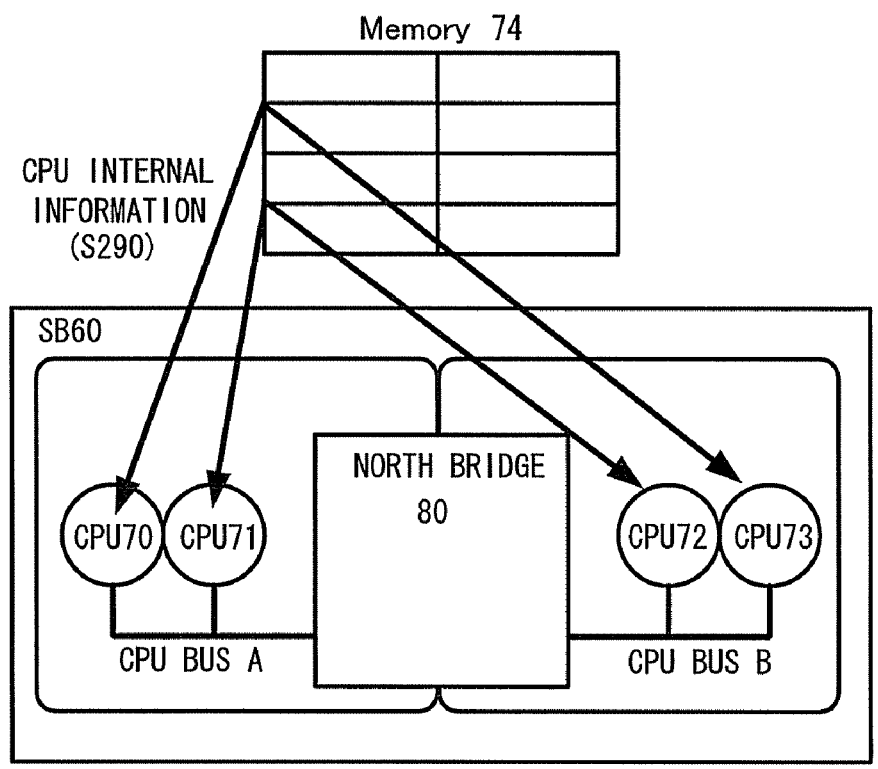
FIG. 20 is a block diagram illustrating operation of a processing step S290 on the system board according to the third embodiment.

Next, the north bridge 80 initializes each of the CPUs 70, 71, 72, and 73, and thereby recovers the information, which has been retracted into the memory, on each pair of the CPUs (S290). FIG. 20 is a block diagram illustrating operation of the processing step S290 on the system board according to this embodiment.

Depending on a state at this time, one of the following two cases is executed.

Figure 21:
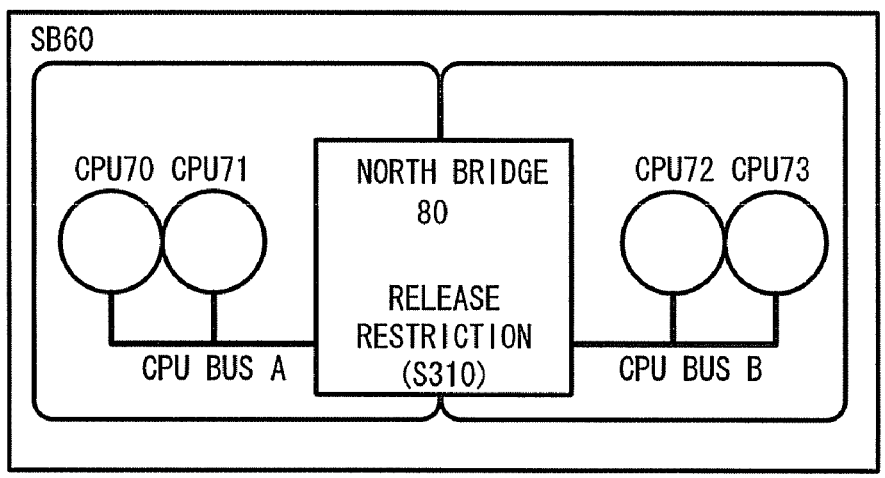
FIG. 21 is a block diagram illustrating operation of a processing step S310 on the system board according to the third embodiment.

The first case is that initialization and recovery of internal information are completed for all the CPUs. At this time, the north bridge 80 releases restriction on external commands, which has been executed in the processing step S240 (S310). FIG. 21 is a block diagram illustrating operation of the processing step S310 on the system board according to this embodiment.

Figure 22:
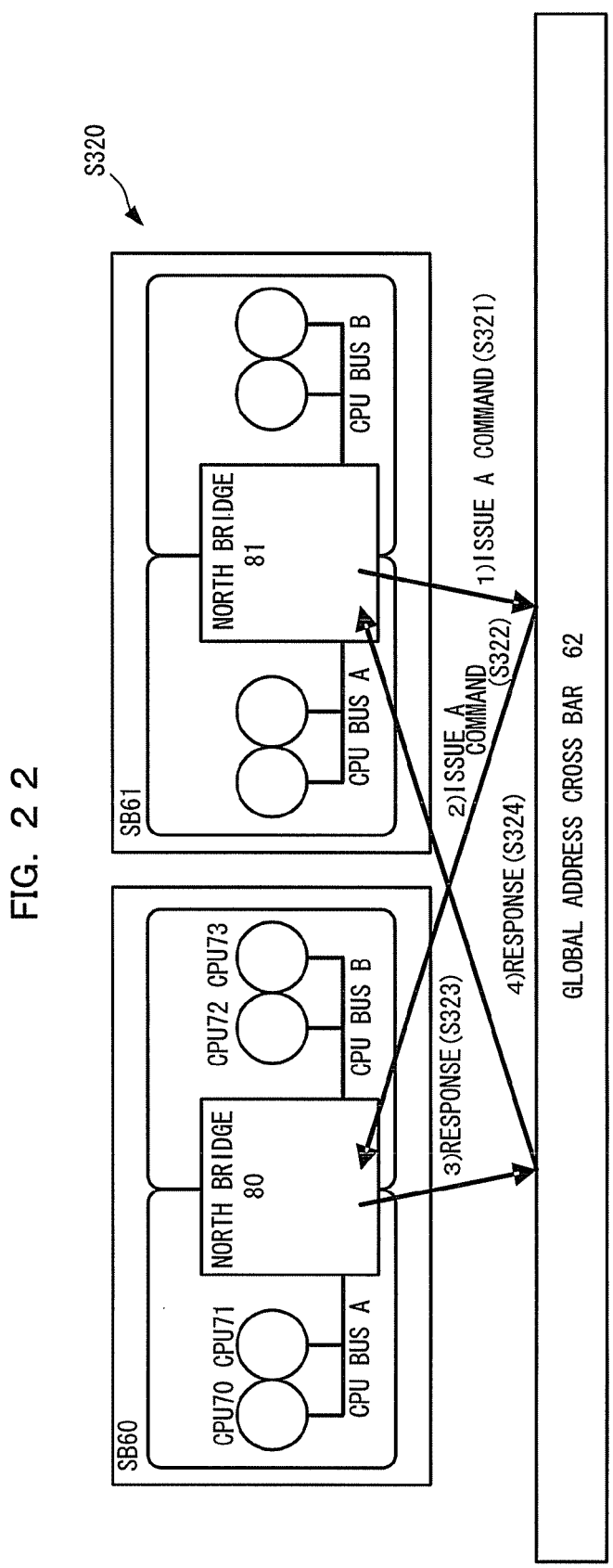
FIG. 22 is a block diagram illustrating operation of a processing step S320 on the system board according to the third embodiment.

Next, the north bridge 80 restarts operation (S320), and resynchronization then ends. FIG. 22 is a block diagram illustrating operation of the processing step S320 on the system board according to this embodiment. As illustrated in this figure, when the north bridge 81 thereafter issues a command for the north bridge 80, the command is sent through the global address cross bar 62 (S321) to the north bridge 80 (S322). The north bridge 80 receives and processes the command, and then issues a response to the north bridge 81. The response is sent through the global address cross bar 62 (S323) to the north bridge 81 (S324).

The north bridge 80 counts a number of executed resynchronizations, and sets in advance an upper limit to a number of allowable resynchronizations. When the number of executed resynchronizations ≧ the upper limit is satisfied, the north bridge 80 only stops a problematic CPU bus without performing any more resynchronization, and continues operation of the system on one single line including only normal CPU bus.

Figure 23:
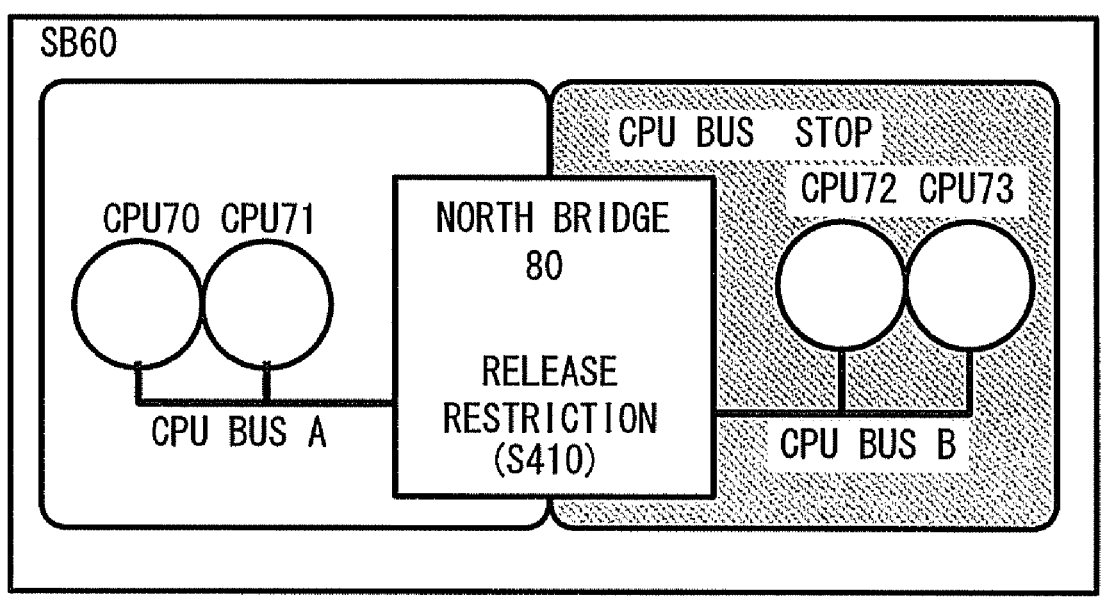
FIG. 23 is a block diagram illustrating operation of a processing step S410 on the system board according to the third embodiment.

The second case is that initialization of CPUs and recovery of internal information are not all complete but a step-out of synchronization occurs like in the processing step S210 during resynchronization. In this case, the north bridge 80 suspends resynchronization and performs operation only on one single line including only normal CPU bus, and releases restriction of external commands which has been carried out in the processing step S240 (S410). FIG. 23 is a block diagram illustrating operation of the processing step S410 on the system board according to this embodiment.

Figure 24:
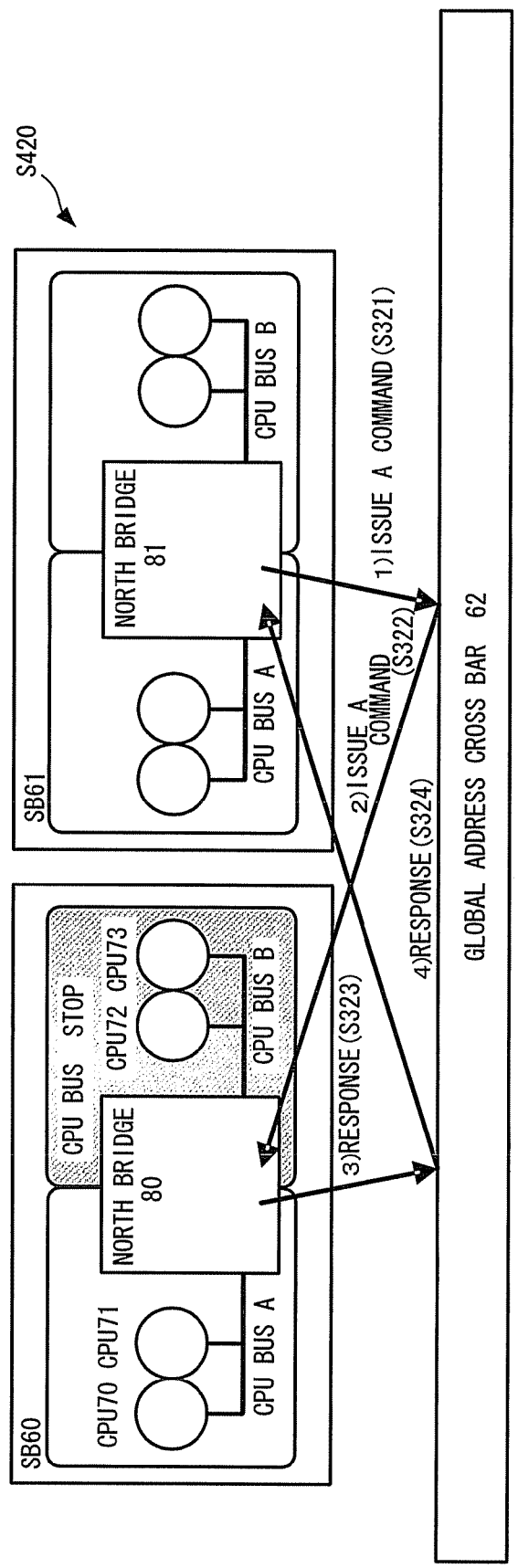
FIG. 24 is a block diagram illustrating operation of a processing step S420 on the system board according to the third embodiment.

Next, the north bridge 80 restarts operation (S420), and the resynchronization ends. FIG. 24 is a block diagram illustrating operation of the processing step S420 on the system board according to this embodiment. As illustrated in this figure, when the north bridge 81 thereafter issues a command for the north bridge 80, the processing steps S321 to S324 are executed.

According to this embodiment, software of each processing device on the lines A and B has a function to record a log when a CE signal is detected. When a CE signal is detected on one of the lines A and B, the remaining line from which the CE is not detected is separated from the system. In this manner, more detailed error logs than in the second embodiment can be collected with use of the software of each processing device. Since collection of detailed error logs is thus achieved, application of hardware errors to predictive monitoring can be expected and lead to improvement in reliability of the mirror mode.

The first, second, and third embodiments described above may be combined with each other.

The processing units correspond to the lines A and B in the embodiments. The detection units correspond to the error checkers in the embodiment. The comparison unit corresponds to a comparator in the embodiments. The control unit corresponds to the selector generation unit in the embodiments. The recording unit corresponds to the CE recording unit in the embodiments or the CE recording function of the processing device.

The detection step corresponds to processing executed by the error checkers in the embodiments. The comparison step corresponds to processing executed by the comparator in the embodiments. The control step corresponds to processing executed by the selector generation unit in the embodiments. The recording step corresponds to processing executed by the CE recording unit in the embodiments or the CE recording function of the processing device. The resynchronization step corresponds to resynchronization in the embodiments.

As has been described above, reliability of resynchronization operation can be improved according to the present invention.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. An information processing device comprising:
   a first processing unit;
   a second processing unit that operates in synchronization with the first processing unit;
   a common unit that outputs an identical signal to the first processing unit and the second processing unit;
   a first detection unit that detects an error occurred in the first processing unit;
   a second detection unit that detects an error occurred in the second processing unit;
   a comparison unit that determines whether the first processing unit and the second processing unit operate in synchronization with each other, by comparing an output from the first processing unit with an output from the second processing unit;
   a control unit that, when the first detection unit and the second detection unit simultaneously detect uncorrectable errors and it is determined that the first processing unit and the second processing unit operate in synchronization with each other, selects one of the first processing unit and the second processing unit; and
   a selector that sends an output from the selected one to the common unit.

2. The information processing device according to claim 1, wherein
   the first detection unit is provided for in the first processing unit, and the second detection unit is provided in the second processing unit.

3. An information processing device comprising:
   a first processing unit;
   a second processing unit that operates in synchronization with the first processing unit;
   a common unit that outputs an identical signal to the first processing unit and the second processing unit;
   a first detection unit that detects an error occurred in the first processing unit;
   a second detection unit that detects an error occurred in the second processing unit;
   a first recording unit that records information concerning the error detected by the first detection unit;
   a second recording unit that records information concerning the error detected by the second detection unit;
   a comparison unit that determines whether the first processing unit and the second processing unit operate in synchronization with each other, by comparing an output from the first processing unit with an output from the second processing unit;
   a control unit that, when the first detection unit and the second detection unit simultaneously detect uncorrectable errors and it is determined that the first processing unit and the second processing unit operate in synchronization with each other, selects one of the first processing unit and the second processing unit; and
   a selector that sends an output from the selected one to the common unit.

4. The information processing device according to claim 3, wherein
   the first recording unit records information concerning correctable errors detected by the first detection unit, and the second recording unit records information concerning correctable errors detected by the second detection unit.

5. The information processing device according to claim 4, wherein
the first recording unit has a first counter,
the information recorded by the first recording unit is the number of the correctable errors counted by the first counter, the second recording unit has a second counter, and the information recorded by the second recording unit is the number of the correctable errors counted by the second counter.

6. The information processing device according to claim 4, wherein
when a correctable error is detected by one of the first and second detection units,
the control unit transfers signals to the common unit from one of the first and second processing units from which the correctable error is detected,
one of the first and second recording units corresponding to the one of the first and second processing units form which the correctable error is detected records the information concerning the correctable error detected by the one of the first and second detection units, and
the common unit resynchronizes the first and second processing units.

7. An error processing method for performing an error processing on an information processing device, which includes a first processing unit, a second processing unit operating in synchronization with the first processing unit, and a common unit that outputs an identical signal to the first processing unit and the second processing unit, the method comprising:
detecting an error occurred in the first processing unit by using a first detection unit;
detecting an error occurred in the second processing unit by using a second detection unit;
determining whether the first processing unit and the second processing unit operate in synchronization with each other, by comparing an output from the first processing unit with an output from the second processing unit;
when the first detection unit and the second detection unit simultaneously detect uncorrectable errors and it is determined that the first processing unit and the second processing unit operate in synchronization with each other, selecting one of the first processing unit and the second processing unit; and
sending an output from the selected one to the common unit.

8. The error processing method according to claim 7, further comprising:
recording information concerning an error detected by any of the first detection unit and the second detection unit.

9. The error processing method according to claim 8, wherein
the information concerns correctable errors detected by any of the first detection unit and the second detection unit.

10. The error processing method according to claim 9, wherein
the information is the number of the correctable errors.

11. The error processing method according to claim 9, further comprising:
when a correctable error is detected
by one of the first and second detection units, transferring a signal to the common unit from the one of the first and second processing units in which the correctable error is detected;
recording information concerning the correctable error; and
resynchronizing the first and second processing units.

* * * * *

UNITED STATES PATENT AND TRADEMARK OFFICE
CERTIFICATE OF CORRECTION

PATENT NO.         : 8,078,920 B2
APPLICATION NO.    : 12/554318
DATED              : December 13, 2011
INVENTOR(S)        : Atsushi Morosawa et al.

It is certified that error appears in the above-identified patent and that said Letters Patent is hereby corrected as shown below:

Title Page, Column 2 Item [56] (Other Publications), Line 1, Delete ""Comunications" and insert -- "Communications --, therefor.

Column 12, Line 31, In Claim 2, after "provided" delete "for".

Column 13, Line 18, In Claim 6, delete "form" and insert -- from --, therefor.

Signed and Sealed this
Sixth Day of March, 2012

David J. Kappos
*Director of the United States Patent and Trademark Office*